United States Patent [19]
Yang

[11] Patent Number: 5,534,933
[45] Date of Patent: Jul. 9, 1996

[54] APPARATUS FOR PROCESSING NTSC TV SIGNALS HAVING DIGITAL SIGNALS ON QUADRATURE-PHASE VIDEO CARRIER

[75] Inventor: Jian Yang, Bensalem, Pa.

[73] Assignee: Samsung Electronics Co., Ltd., Kyungki-do, Rep. of Korea

[21] Appl. No.: 141,070

[22] Filed: Oct. 26, 1993

[51] Int. Cl.[6] ...................................................... H04N 7/04
[52] U.S. Cl. ......................... 348/433; 348/475; 348/484; 329/357; 375/301; 375/329
[58] Field of Search ................................... 348/470, 462, 348/475, 466, 484, 486, 533, 433; 375/61, 52, 80, 83; 329/304, 356, 357; H04N 7/04, 5/08

[56] References Cited

U.S. PATENT DOCUMENTS

| | | | |
|---|---|---|---|
| 5,029,003 | 7/1991 | Jonnalagadda . | |
| 5,053,860 | 10/1991 | Tsinberg | 348/437 |
| 5,063,446 | 11/1991 | Gibson | 348/484 |
| 5,229,847 | 7/1993 | Gibson | 348/475 |
| 5,278,637 | 1/1994 | Naimpally | 348/488 |

OTHER PUBLICATIONS

Taub et al, "Principles of Communication Symbols", 1986, pp. 264, lns 4–12, & 267, lines 11–21.

Primary Examiner—Safet Metjahic
Assistant Examiner—Jeffrey S. Murrell
Attorney, Agent, or Firm—Sughrue, Mion, Zinn, Macpeak & Seas

[57] ABSTRACT

A vestigial-sideband amplitude-modulation transmitter using a balanced modulator for generating a suppressed carrier that is in quadrature phasing with the video carrier of a television signal receives as modulating signal a binary phase-shift-keying (BPSK) signal encoding digital signals. The quadrature transmission reduces the visibility of the lower-frequency PSK sidebands in the TV signal as viewed on screen. The symbol rate of the PSK is made to be a multiple of the horizontal line scan rate of video signal. To reduce the visibility of the higher-frequency PSK sidebands in the TV signal as viewed on screen, the BPSK is transmitted twice during respective frames of successive pairs of data frames, which data frames recur at the same rate as video frames. To reduce the interference of video with the PSK, the PSK is subjected to partial-response filtering at the transmitter and is highpass line-comb filtered at the digital signal receiver.

48 Claims, 10 Drawing Sheets

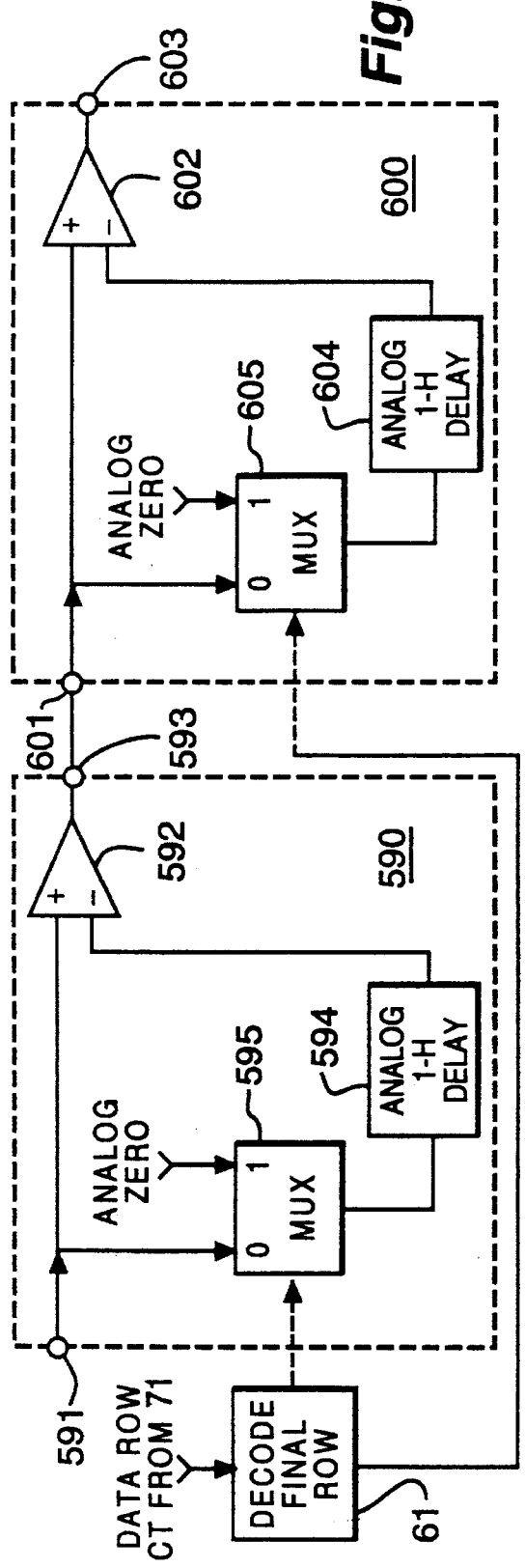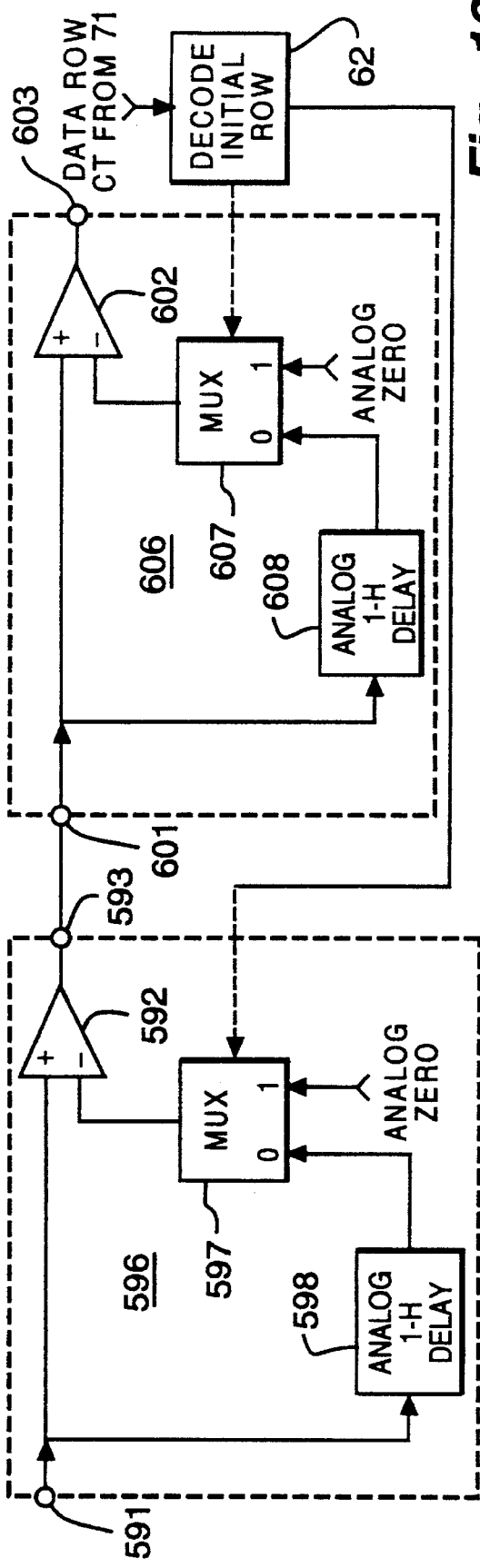

APPARATUS FOR PROCESSING NTSC TV SIGNALS HAVING DIGITAL SIGNALS ON QUADRATURE-PHASE VIDEO CARRIER

The invention relates to transmitters for burying digital signals in analog television signals and receivers for recovering digital signals buried in analog television signals.

BACKGROUND OF THE INVENTION

Relatively small (e.g., 3 to 5 IRE) signals encoding digital information can be admixed together with composite video signals without being readily evident in television pictures generated from those composite video signals if suitable restrictions on the digital signal format are observed. This is pointed out by A. L. R. Limberg, C. B. Patel and T. Liu in their U.S. patent application Ser. No. 08/108,311 filed Aug. 20, 1993, entitled APPARATUS FOR PROCESSING MODIFIED NTSC TELEVISION SIGNALS, WITH DIGITAL SIGNALS BURIED THEREWITHIN, and incorporated by reference herein. The inventions described in U.S. patent application Ser. No. 08/108,311 like the inventions described herein are assigned to Samsung Electronics Co., Ltd., pursuant to pre-existing employee agreements so to assign inventions made within the scope of employment. U.S. patent application Ser. No. 08/108,311 describes phase-shift-keyed (PSK) modulation of a subcarrier at an odd multiple of one-half scan line frequency with serial-bit digital data supplied at a symbol rate that is a multiple of one scan line frequency. U.S. patent application Ser. No. 08/108, 311 indicates a preference for repeating frames of the modulated subcarrier in antiphase in successive pairs of consecutive frames of the NTSC television signal. Such repetition of data in pairs of frames makes PSK subcarrier accompanying the composite video signal detected from the NTSC television signal less apparent in images that are generated from the composite video signal for viewing on a screen. Such repetition of data in pairs of frames also provides a basis for using frame-comb filtering in a digital signal receiver to separate PSK subcarrier from the luminance portion of the composite video signal that describes static portions of successive television images. U.S. patent application Ser. No. 08/108,311 also indicates a preference for repeating the modulation of the digital data in antiphase in contiguous pairs of adjoining scan lines of the NTSC television signal, this providing a basis for using line-comb filtering in the digital signal receiver to separate PSK subcarrier from the chrominance portion of the composite video signal.

Such procedures generate a broadband frequency spectrum overlapping frequency spectrum of the NTSC television signal, but with most of the energy in the former frequency spectrum falling into the so-called Fukinuki "windows" or "holes" in the latter frequency spectrum. To gain an understanding of what these "windows" or "holes" are, the reader is referred to T. Fukinuki et al., "Extended Definition TV Fully Compatible with Existing Standards", IEEE Transactions on Communications, Vol. COM-32, No. 8, August 1984, pages 948–953; and T. Fukinuki et al., "NTSC FULL COMPATIBLE EXTENDED DEFINITION TV PROTO MODEL AND MOTION ADAPTIVE PROCESSING", reprinted from IEEE Communications Society IEEE Global Telecommunications Conference, No. 4.6, Dec. 2–5, 1985, pages 113–117; the disclosures of which are incorporated hereinto by reference. U.S. Pat. No. 4,660,072 issued Apr. 21, 1987 to T. Fukinuki and entitled TELEVISION SIGNAL TRANSMISSION SYSTEM also describes Fukinuki "windows" or "holes" and is incorporated hereinto by reference.

When the NTSC television signal with digital signals buried therewithin is reproduced on the viewing screen of a conventional television set, spectral energy falling into the Fukinuki windows of luminance signal tends not to be visible to a viewer who is at a normal viewing distance away from the screen or is further away. To some extent this is because of adjacent-line averaging effects owing to limits on spatial resolution by the human visual system when viewing the screen from a distance. To a greater extent this because of frame averaging effects owing to limits on temporal resolution by the human visual system and to persistence of the phosphors in the viewing screen. TV sets that use line-comb filtering to separate luminance and chrominance components of composite video signal supplied from the video detector cancel spectral energy falling into the Fukinuki windows of luminance signal, so frame averaging effects need not be relied on as the only mechanism for making the digital video inapparent in the television images as viewed on the screen of a TV set. Top-of-the-line TV sets that use frame-comb filtering can cancel spectral energy falling into the Fukinuki windows of chrominance signal as well as into the Fukinuki windows of luminance signal. However, this spectral energy will appear as color noise in color TV sets that do not employ frame-comb filtering. The desire to keep this color noise reasonably low has been a principal limitation on the permissible amplitude of the signals encoding digital information.

In practice, when using the Fukinuki "windows" or "holes" for the transmission of analog video information, the spatial and temporal correlation/anti-correlation patterns of the additional video information prevent the degree of randomness of signal that is necessary for its being completely hidden in a normal television picture received by TV receivers already in the field, giving rise to so-called "Fukinuki phantoms" in the horizontal spatial frequencies below about 1 MHz in the video detector response. Fukinuki phantoms can exist for PSK subcarriers that amplitude-modulate the VSB AM picture carrier in-phase. However, the likelihood of noticeable Fukinuki phantoms is very low, owing to the low power of these PSK subcarriers and the low probability of repeating digital words at frame intervals, except during forced repetition of data in consecutive frames.

U.S. patent application Ser. No. 08/108,311 describes a suppressed, vestigial-sideband, amplitude-modulated (VSB AM) carrier of the same frequency as the VSB AM picture carrier, but in quadrature phasing therewith, being used to transmit the subcarrier modulated with digital data. This procedure suppresses Fukinuki phantoms to the extent they occupy the band where the VSB AM carriers are DSB AM in character. Transmitting the digital information in VSB AM sidebands of a suppressed carrier that is in quadrature with the VSB AM video carrier permits the transmission of the digital information at relatively low power with less increase in the $E^2/R$ radiated power from the antenna than would be the case with transmitting the digital information in the VSB AM sidebands of the video carrier.

In each of the digital signal receivers described in U.S. patent application Ser. No. 08/108,311 synchronous detection of the quadrature-phase VSB AM carrier recovers the digital subcarrier, without substantial accompanying composite video signal energy in the baseband extending up to 0.75 MHz frequency. Above 0.75 MHz the VSB AM video carrier begins the transition from being a double-sideband amplitude-modulated (DSB AM) carrier to being a single-sideband amplitude-modulated (SSB AM) carrier. The composite video signal is detected with gradually increasing efficiency up to the 1.25 MHz frequency at which roll-off of the vestigial sideband is complete. Over the same 0.75 to 1.25 MHz frequency range the efficiency with which the digital subcarrier is detected gradually decreases to half its value below 0.75 MHz. A synchronous video detector detecting the quadrature-phase VSB AM video carrier will, providing the intermediate-frequency (IF) amplifier passes the vestigial sideband, generate a response to the PSK subcarrier and remnants of NTSC composite video signal that does not include direct components or synchronizing pulses. This reduces the dynamic range of the synchronous video detector response to the quadrature-phase VSB AM video carrier, easing the problem of digitizing the response without losing low-level PSK subcarriers because of quantization effects.

U.S. patent application Ser. No. 08/108,311 describes cascading of a lowpass line-comb filter and a highpass frame-comb filter following the synchronous video detector for quadrature-phase VSB AM video carrier. The lowpass line-comb filter is for separating the frequency spectrum of a PSK subcarrier having a frequency that is an odd multiple of half-scan-line frequency from chrominance signal portions of the frequency spectrum of an NTSC signal, particularly of an NTSC signal that has been appropriately prefiltered. The highpass frame-comb filter is for separating the frequency spectrum of a PSK subcarrier having a frequency that is an odd multiple of half-scan-line frequency from motion-free luminance signal portions of the frequency spectrum of an NTSC signal. U.S. patent application Ser. No. 08/108,311 teaches that the remnant spectrum of the NTSC signal in the response of the cascaded highpass comb filters can be viewed as the frequency spectrum of a jamming signal accompanying the PSK signal. Accordingly, the remnant spectrum of the NTSC signal in the response of the cascaded highpass comb filters can be discriminated against by synchronous symbol detection.

U.S. patent application Ser. No. 08/108,311 advocates the use of binary phase-shift-keying of a PSK carrier, a single-sideband (SSB) of which is selected for translation in frequency to form an upper sideband of a suppressed subcarrier that is at a frequency which is a small odd multiple of one-half scan line frequency. The generation of this SSB BPSK subcarrier introduces complications in the construction of the transmitter, and the detection of this SSB BPSK subcarrier introduces complications in the construction of the digital signal receiver. In the digital signal receiver, there is a need for one or more synchronous detectors for demodulating a PSK subcarrier and one or more oscillators with automatic phase and frequency control (AFPC) for regenerating the unmodulated subcarrier(s) used in synchronously detecting a PSK subcarrier. The phase lock loop used in the AFPC to lock each local oscillator to horizontal sync, color burst, PSK suppressed subcarrier or symbol transitions is prone to problems in regard to maintaining stability of the frequency of oscillations. When upper sideband SSB BPSK is received on a subcarrier, the frequency of which is only a 100 kHz or so, the digital signal receiver uses an upconverter, single-sideband filtering, and a downconverter after the quadrature-phase video detector in order to synchronously detect the BPSK modulation.

These complications and problems are avoided in the inventions described herein by binary phase-shift-keying the quadrature-phase VSB main carrier itself, rather than a subcarrier thereof. In the digital signal receiver the synchronous video detector for quadrature-phase VSB video carrier detects the BPSK modulation directly. The efficiency of this detection is reduced above 0.75 MHz as the BPSK carrier begins the transition from being a double-sideband amplitude-modulated (DSB AM) carrier to being a single-sideband amplitude-modulated (SSB AM) carrier. Over the 0.75 to 1.25 MHz frequency range the efficiency with which the digital subcarrier is detected gradually decreases to half its value below 0.75 MHz, which value of detection efficiency is maintained for frequencies above 1.25 MHz, but below the roll-off of the lowpass filtering establishing detector bandwidth. At the transmitter, the high frequencies of the pulse train used for phase shift keying can be pre-emphasized to compensate for the loss in detection frequency at the digital signal receiver when the BPSK modulation becomes single-sideband in nature.

U.S. patent application Ser. No. 08/108,311 indicates a preference for repeating the BPSK modulation in antiphase in contiguous pairs of adjoining scan lines of the NTSC television signal, to provide a better basis for separating digital data from interfering chrominance sidebands of the suppressed color subcarrier of the NTSC composite video signal. This retransmission of the BPSK modulation halves the digital transmission rate in the long term; and the attempt to utilize, for digital data transmission, the band of baseband frequencies of the NTSC composite video signal already occupied by chrominance sidebands for digital data transmission generates color noise in most of the color TV sets already in existence. A better system compromise is to narrow the band of baseband frequencies into which digital modulation is introduced for transmission, so it is not co-extensive with the band occupied by the chrominance sidebands, and not to repeat the digital modulation in antiphase in contiguous pairs of adjoining scan lines of the NTSC television signal. This sacrifice of bandwidth for transmitting digital information avoids the digital modulation causing color noise in existing color TV sets, and not repeating the digital modulation in antiphase in adjoining scan lines increases the digital transmission rate to make up for the sacrificed bandwidth. In U.S. patent application Ser. No. 08/108,311 the digital modulation repeated in antiphase in adjoining scan lines is lowpass line-comb filtered to double the power of the PSK and improve its capability of withstanding interference from the NTSC composite signal remnants as a jamming signal. To the extent that this loss is significant, it can be made up for by increasing the power of the transmitted PSK (e.g., increasing it from 3 IRE to 4.5 IRE), since the appearance of color noise (which establishes the practical limitation on the power of the transmitted PSK when its frequencies overlap those of chroma) is not a problem with the narrower bandwidth of modulating signal. While there is some increase in the likelihood of impulse noise completely obliterating the reception of the PSK when the digital modulation is not repeated in antiphase in adjoining scan lines, the suppression of impulse noise through error-correcting coding is achieved at a lower overhead cost.

Not having to repeat digital modulation in antiphase in adjoining scan lines, so as to be able to separate digital modulation from interfering chrominance sidebands by line-comb filtering, provides the freedom to design the signal for data transmission such that line-comb filtering can be used to separate digital modulation from interfering luminance signal. Dynamic portions of the television images will not repeat from one frame to the next, so frame-comb filtering will not separate luminance signal descriptive of them from digital modulation that is repeated in antiphase in respective frames of successive pairs of frames, which pairs do not overlap in time. Luminance signal descriptive of these dynamic portions of the television images have a pronounced tendency to repeat at corresponding horizontal positions in successive horizontal scan lines, and so can be discriminated against by highpass line-comb filtering. The modulation of the digital data in contiguous pairs of adjoining scan lines can be repeated, to afford a basis for passing the data through the highpass line-comb filtering without change in the data, but this halves the long-term data rate through the system, without gain of sufficient compensating advantage in return.

Better practice, it is pointed out herein, is to use partial-response filtering in the transmitter of a type in which the digital partial-response filter response recovered in the digital signal receiver as binary digital data will, when supplied as input signal to a highpass line-comb filter, generate ternary or other multiple-level digital data. This procedure does not reduce the long-term data rate through the system.

SUMMARY OF THE INVENTION

The invention in aspects thereof relates to a system for transmitting digital information by binary phase-shift-keying a vestigial-sideband carrier, which carrier though suppressed would be in quadrature phasing with the vestigial-sideband carrier amplitude-modulated by composite video signal. Preferably, the digital information is placed into bit-serial format, with a bit rate that is a multiple of the horizontal line scan rate of the composite video signal, and the following further data formatting procedures are performed before converting the data to analog form for binary phase-shift-keying the vestigial-sideband carrier. A succession of data frames each of the same duration as a frame of composite video signal are defined, each data frame having a number of data rows therein equal to the number of horizontal scan lines in a frame of composite video signal. The successive data frames are identified by respective modular ordinal numbers consecutively assigned in order of their occurrence. The bit-serial data are passed through a partial-response filter to generate data, which data in a digital signal receiver are readily separated from interfering remnants of the accompanying composite video signal by line-comb filtering before symbol decision is made. In the transmitter these data are apportioned for transmission in the odd-numbered data frames. The partial-response filter response in each odd-numbered data frame is one's complemented to generate the data transmitted in the next even-numbered data frame. This transmission of the data twice, but in opposite logic senses, provides for frame averaging of the data accompanying video derived from the accompanying composite video signal in a television receiver and viewed on its viewing screen. In a digital signal receiver the transmission of the data twice, but in opposite logic senses, facilitates frame-comb filtering for further separating data from interfering remnants of the accompanying composite video signal before symbol decision is made.

The invention relates in further aspects thereof to the television signal involved in so transmitting digital information buried in a television signal.

The invention relates in still further aspects thereof to a system for receiving digital information transmitted via the vestigial-sideband binary phase-shift-keyed quadrature-phase carrier. After detection of the binary phase-shift-keying of the quadrature-phase carrier, the detected signal is line- and frame-comb filtered to suppress accompanying remnants of composite video signal before application to symbol decision circuitry that recovers the transmitted digital information in bit-serial format.

Figure 7:
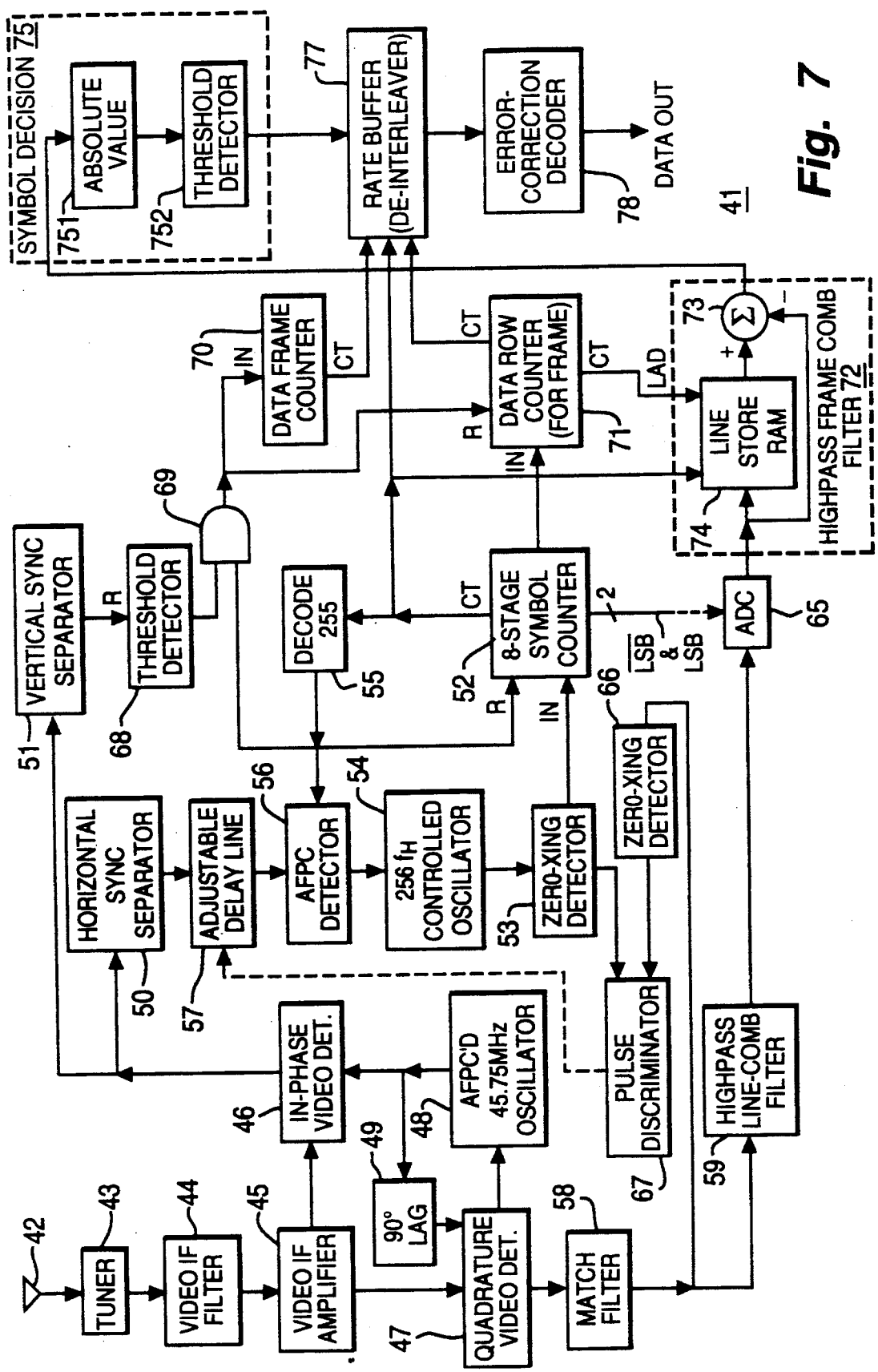
Figure 8:
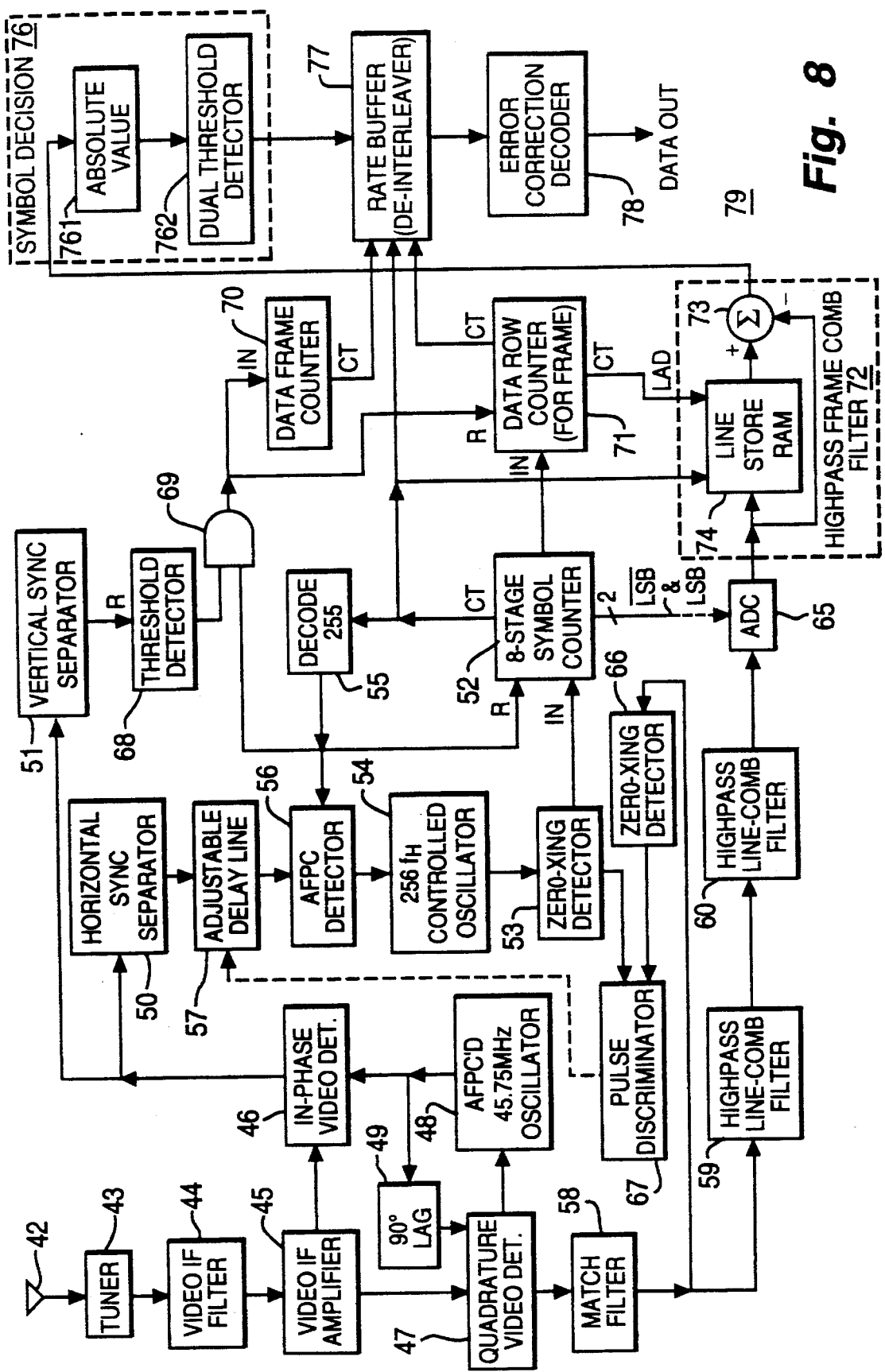

Each of FIGS. 7 and 8 is a schematic diagram of a respective digital-signal receiver for receiving a television signal with a digital signal buried therewithin and extracting the buried digital signal, both of which digital-signal receivers embody further aspects of the invention.

Figure 9:
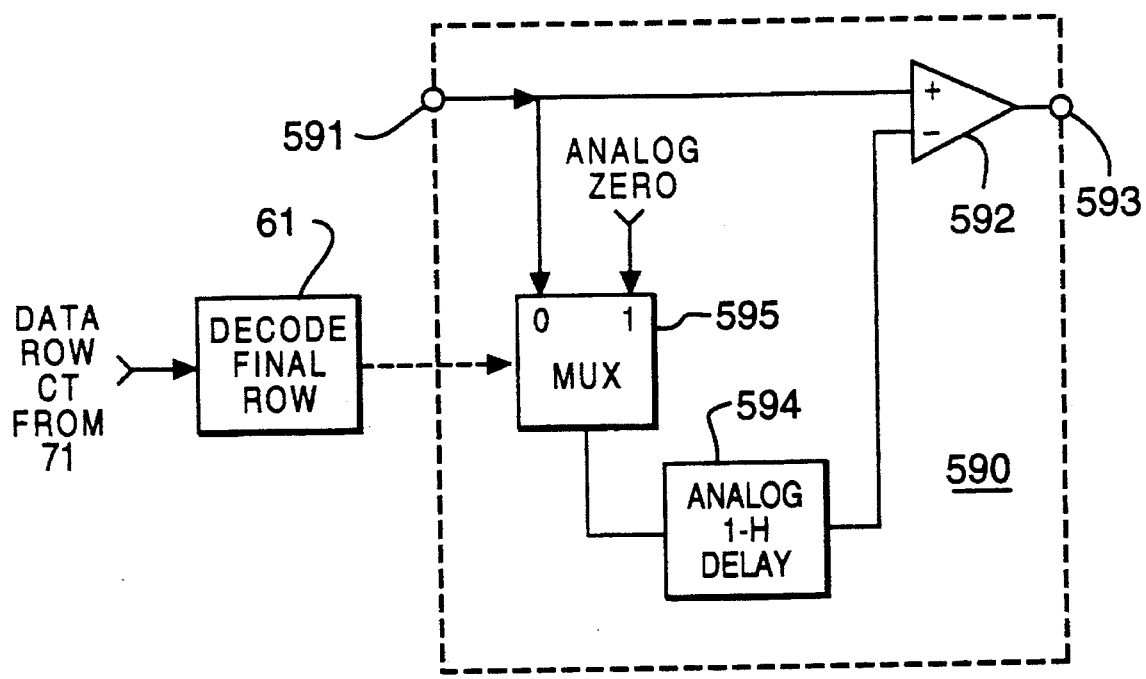
Figure 10:
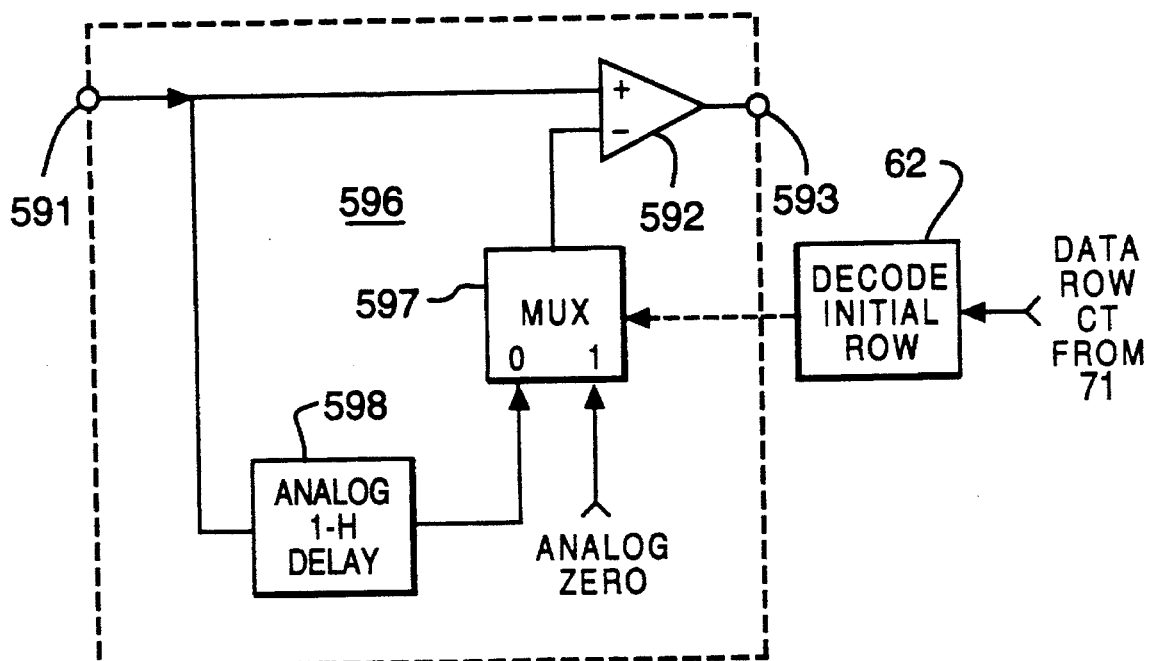

Each of FIGS. 9 and 10 is a schematic diagram showing in detail one of the different forms the comb filtering in the FIG. 7 digital-signal receiver can take.

Each of FIGS. 11 and 12 is a schematic diagram showing in detail one of the different forms the comb filtering in the FIG. 8 digital-signal receiver can take.

Figure 1:
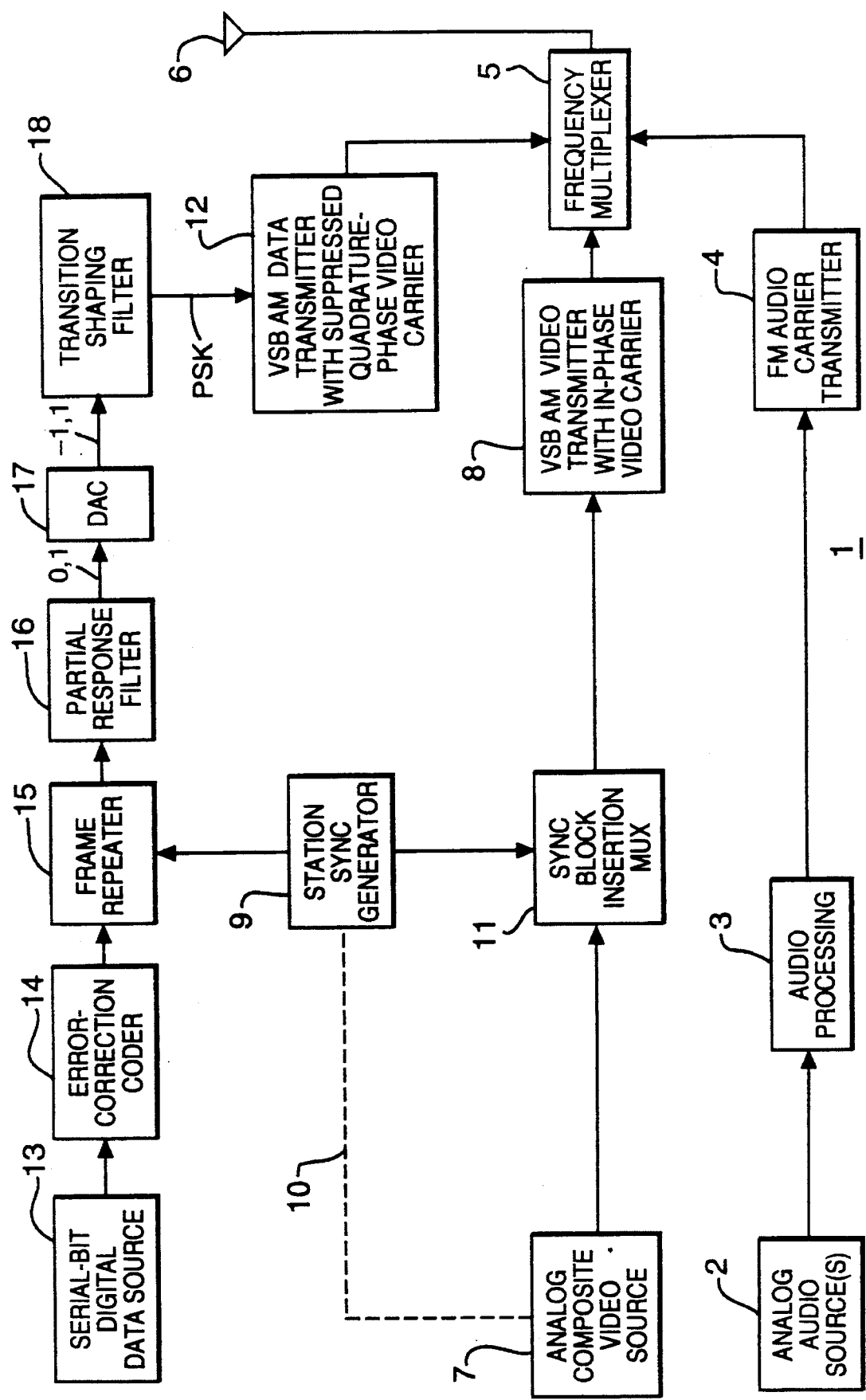
FIG. 1 is an overall schematic diagram of a television transmitter for transmitting a television signal with a digital signal buried therewithin, which television transmitter embodies aspects of the invention.
Figure 6:
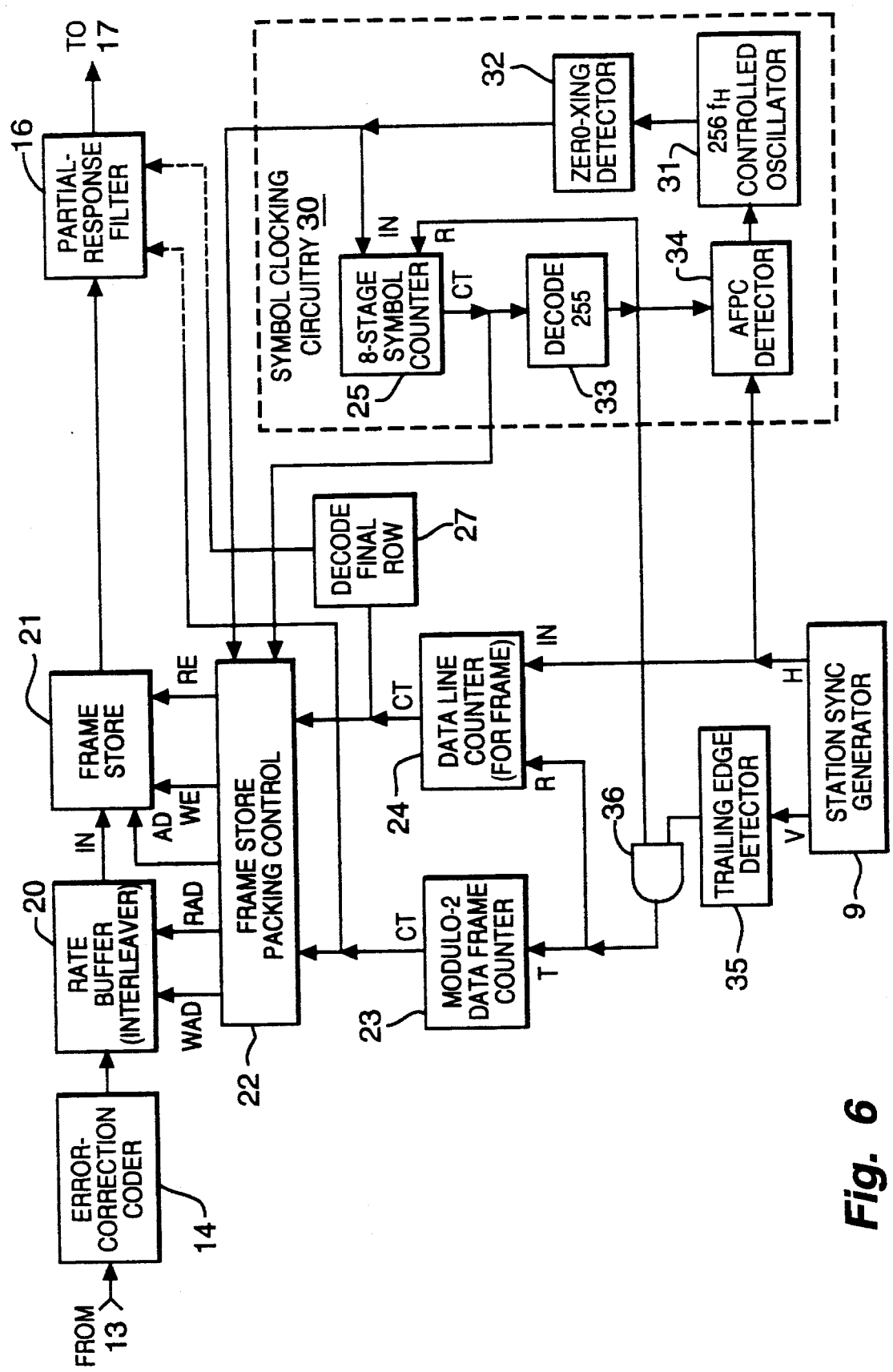
FIG. 6 is a schematic diagram showing in detail a portion of the FIG. 1 television transmitter used for digitally filtering the digital data from which the phase-shift keying signal is to be generated, which phase-shift keying signal modulates the suppressed, quadrature-phase video carrier.
Figure 13:
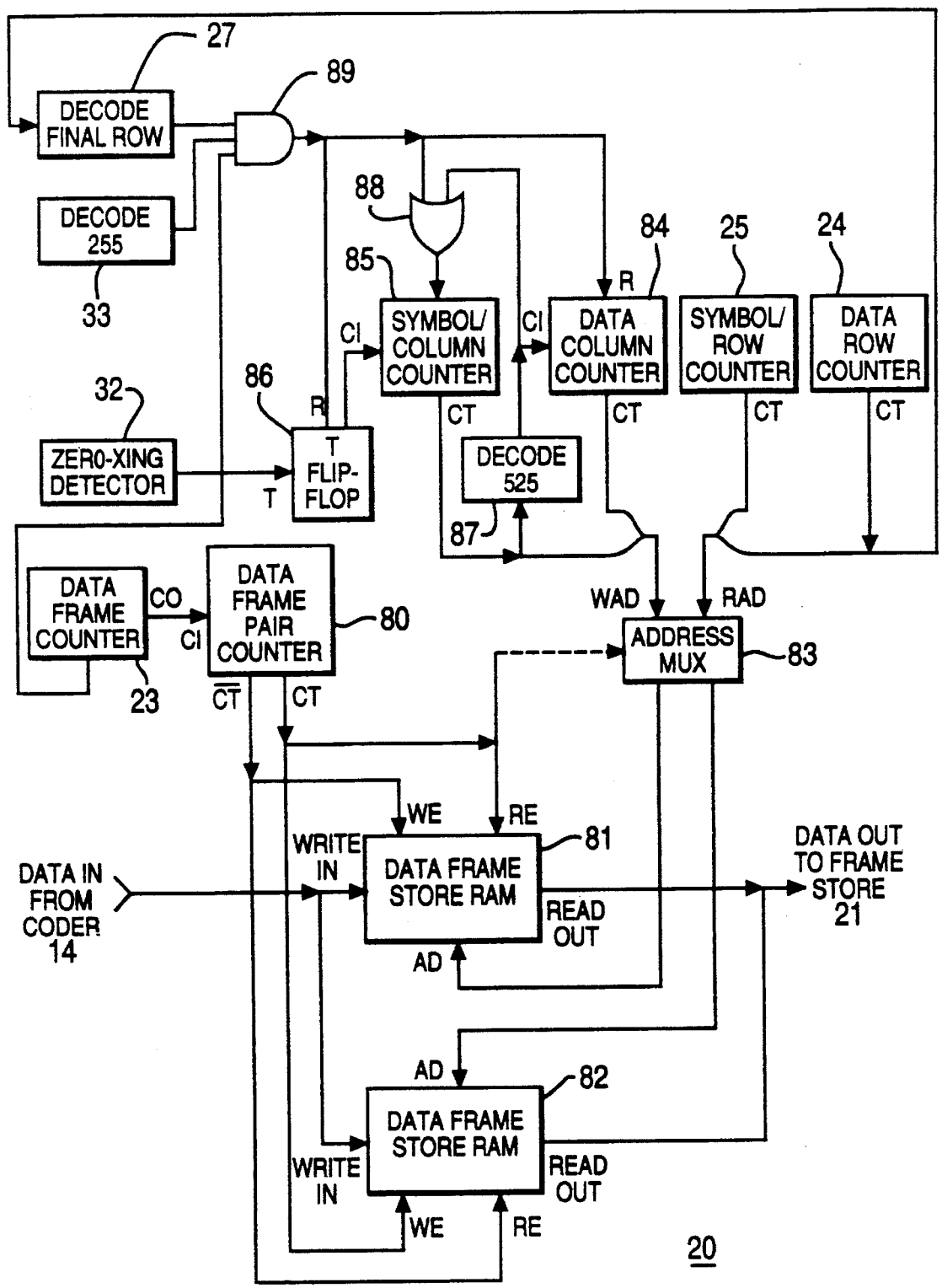

FIG. 13 is a schematic diagram of a rate buffer operated as an interleaver, which can be used in the portion of the FIG. 1 television transmitter shown in FIG. 6.

Figure 14:
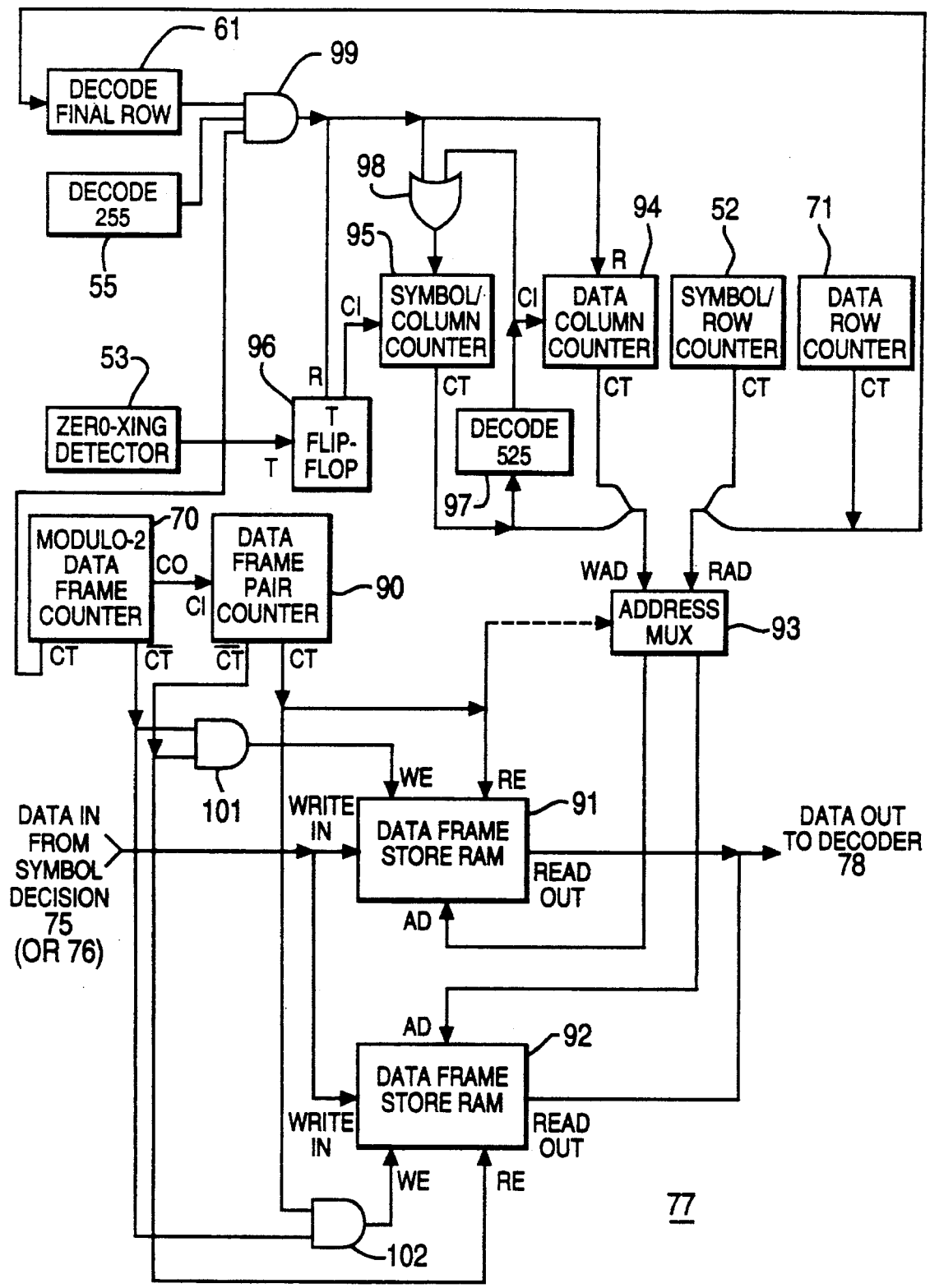

FIG. 14 is a schematic diagram of a rate buffer operated as a de-interleaver, which can be used in the digital-signal receiver circuitry of FIG. 7 or FIG. 8.

DETAILED DESCRIPTION

Generally, equalizing delays have been omitted from the drawing figures to simplify them and to make them easier to understand. One skilled in the art of video signal processor design will appreciate the need for such delays to properly time-align pixels or data subject to different delays on different processing paths due to the differing processing performed in those paths. One skilled in the art would understand where such delays would be necessary and how long each of the delays would have to be, and such delays will not be described or discussed below. In logic circuitry, one skilled in the art would understand how to provide the shimming delays required to overcome undesired "logic race" conditions or to compensate for latent delays in performing logic operations; and details of logic circuitry design with regard to providing shimming delay will not be discussed below. Further, where an analog-to-digital converter (ADC) is shown or described in the present disclosure, one skilled in the art would understand the desirability of preceding such converter with an anti-aliasing lowpass filter, and how this could be implemented, and such will not be further described in detail below. Also, where a digital-to-analog converter (DAC) is shown or described in the present disclosure, one skilled in the art would understand the desirability of following such converter with a sampling clock rejection lowpass filter, and how this could be implemented, and such will not be further described in detail below.

FIG. 1 shows a television transmitter 1 for transmitting a television signal with a digital signal buried therewithin. A source 2 supplies one or more analog audio signals to audio processing circuitry 3 which supplies a modulating signal to an audio carrier transmitter 4 for modulating the frequency of the audio carrier wave. The audio processing circuitry 3 includes delay as needed for synchronizing sound and picture. The audio processing circuitry 3, in accordance with customary practice, also includes pre-emphasis networks for the analog audio signal(s) and may include apparatus for generating stereophonic and secondary audio program (SAP) subcarriers for inclusion in the modulating signal supplied to the audio carrier transmitter 4. The frequency-modulated (FM) audio carrier is typically supplied from the transmitter 4 to a multiplexer 5 to be frequency-multiplexed with in-phase VSB AM picture carrier and quadrature-phase VSB BPSK data carrier. In a television transmitter 1 for over-the-air broadcasting, this multiplexer 5 typically takes the form of an antenna coupling network and the resulting frequency-multiplexed signal is broadcast from a transmitting antenna 6. A television transmitter for the head end of a cable broadcasting system will not have the transmitting antenna 6 used in over-the-air broadcasting. The multiplexer 5 will take different form, with the frequency-multiplexed signal from the channel under consideration being further frequency-multiplexed with the frequency-multiplexed signals from other channels, and with the resulting signal being applied by linear amplifiers to the trunk cables of the cable broadcasting system.

In FIG. 1 a source 7 supplies an analog composite video signal that is the basis for the modulating signal supplied to a transmitter 8 that in turn supplies the VSB AM picture carrier to the multiplexer 5, there to be frequency-multiplexed with the frequency-modulated (FM) sound carrier. The vertical synchronizing pulses, horizontal synchronizing pulses and color burst of analog composite video signal from the source 7 are synchronized with corresponding signals supplied by a station synchronizing signal generator 9. A control connection 10 between the source 7 of composite video signal and the station sync generator 9 symbolizes the means used for this synchronization. Where the source 7 is a remote generator of composite video signal, such as a downtown studio or another television station networked with the local television station, the control connection 10 may be a genlock connection to the station sync generator 9. Where the source 7 is a local camera, that local camera may receive synchronization information from the station sync generator 9 via the control connection 10. These and other synchronizing schemes including those for video tape recorders and telecine apparatus are familiar to those skilled in the art. Typically, a time-division multiplexer 11 is used to insert sync block information including vertical synchronizing pulses, horizontal synchronizing pulses, equalizing pulses, color burst and pedestals (commonly referred to as "porches") into the composite video signal applied as modulating signal to the picture carrier transmitter 8 in place of original sync block information.

The FIG. 1 television transmitter 1 differs from those currently used in that a further VSB AM transmitter 12 generates a vestigial-sideband, binary phase-shift-keyed (VSB BPSK) suppressed carrier in quadrature phasing with the VSB AM video carrier for NTSC composite video signal. This further VSB AM transmitter 12 can include a balanced modulator, balanced both against carrier and against BPSK modulating signal, and can further include a 90°-phase-shift network receiving in-phase video carrier from the VSB AM transmitter 8 and supplying quadrature-phase video carrier to the balanced modulator. The VSB BPSK signal from the transmitter 12, like the VSB AM video carrier amplitude-modulated by NTSC composite video signal from the transmitter 8, is supplied to the multiplexer 5, there also to be frequency-multiplexed with the frequency-modulated (FM) sound carrier. A source 13 supplies a digital signal in serial-bit form to an error-correction coder 14 for inserting additional bits of error-correcting code into the serial-bit stream applied to a frame repeater 15. The frame repeater 15 supplies each frame of data received as its input signal twice as its output signal. The output signal from the frame repeater 15 is supplied to a partial-response filter 16, which introduces correlation into the data at corresponding points in consecutive horizontal scanning lines. The digital response from the partial-response filter 16 is supplied to a digital-to-analog converter (DAC) 17, for conversion to an analog keying signal. The DAC 17 supplies a high-frequency pre-emphasis and transition-shaping filter 18 with keying signal that is of a prescribed positive value responsive to a digital ZERO and is of a prescribed negative value responsive to a digital ONE. The prescribed negative level of analog modulating signal has the same absolute value as the prescribed positive level of analog modulating signal. The response of the filter 18 is a keying signal supplied to a balanced modulator in the transmitter 12, which balanced modulator also receives a quadrature-phase video carrier wave to be modulated. The transmitter 8 that supplies the VSB AM video carrier amplitude-modulated by NTSC composite video signal to the multiplexer 5 is carefully designed and operated so as to avoid incidental phase modulation that might interfere with the quadrature-phase VSB BPSK suppressed carrier from the transmitter 12. Since the quadrature-phase VSB AM carrier for PSK is suppressed, the phasing of the signal in which the VSB PSK and VSB AM carriers are combined is not appreciably different from that of the in-phase VSB AM video carrier. While FIG. 1 shows the transmitters 8 and 12 as being separate from each other, in practice the same upper sideband filters and final amplifier stages can be shared by the transmitters 8 and 12.

Motion-adaptive filters for eliminating significant luminance signal content in the Fukinuki holes are known in the art from work done in EDTV and in television tape recording. Such filtering of the composite video signal supplied by the source 7 in FIG. 1 will reduce the likelihood of interference with the digital data modulating a subcarrier subsequently buried in the composite video signal, but the changes in the composite video signal cause barely perceptible changes in the images viewed on screen. In television tape recording using folded-spectrum luminance signals, motion-adaptive filters are used to prepare the luminance signal for folding its upper-frequency half band into the Fukinuki holes of its lower-frequency band, thereby to generate a folded-spectrum video signal of a bandwidth half that occupied by the luminance signal prior to spectrum folding. Such a motion-adaptive filter is described in U.S. Pat. No. 5,113,262 issued May 12, 1992 to C. H. Strolle et alii, entitled "VIDEO SIGNAL RECORDING SYSTEM ENABLING LIMITED BANDWIDTH RECORDING AND PLAYBACK" and assigned to Samsung Electronics, Co., Inc. by its inventors pursuant to agreements to so assign their inventions in force at the time their invention was made.

Figure 2:
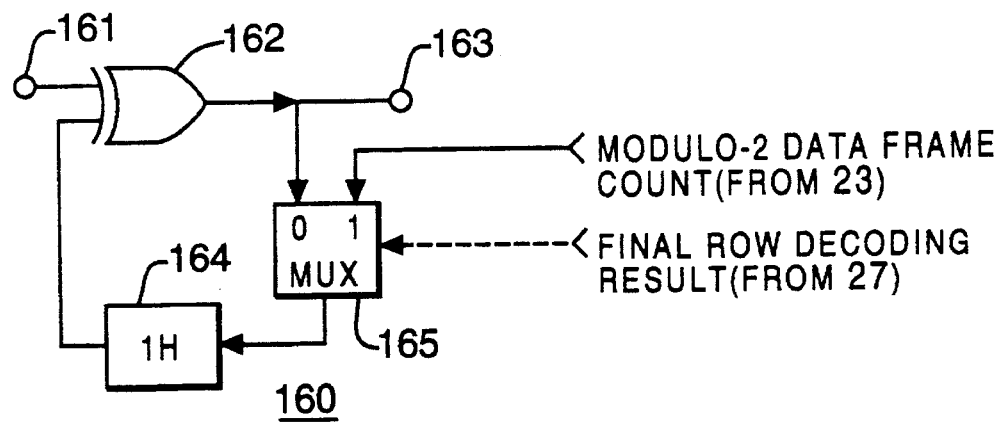
FIGS. 2, 3, 4 and 5 are schematic diagrams of partial-response filters, any one of which can be used in the FIG. 1 television transmitter.

FIG. 2 shows one form 160 the partial-response filter 16 may take. Digital input signal in serial-bit form is applied via an input terminal 161 to a first input of a two-input exclusive-OR (XOR) gate 162, the output from which connects to an output terminal 163 to supply thereto the response of the partial-response filter 160. A second input of the XOR gate 162 receives from the read output connection of a digital delay line 164 a delayed response to the output signal from a multiplexer 165 applied to the write input connection of the digital delay line 164. The digital delay line 164, which can be implemented as a cyclically addressed line storage memory operated in a read-then-write-over mode, provides "1H" delay equal to the period of one television horizontal scan line. Except when a FINAL ROW DECODING RESULT supplied as control signal to the multiplexer 165 is ONE, indicating that the final data row of a data frame is being supplied to the partial-response filter 160, the multiplexer 165 selects the partial-response filter 160 response at the output terminal 163 for application to the write input connection of the digital delay line 164.

When the FINAL ROW DECODING RESULT supplied as control signal to the multiplexer 165 is ONE, indicating that the final data row is being supplied to the partial-response filter 160, the multiplexer 165 applies MODULO-2 DATA FRAME COUNT to the write input connection of the digital delay line 164. When the MODULO-2 DATA FRAME COUNT so applied is a ZERO during the final row of the final frame of a pair of frames, a line of ZEROs is written into the digital delay line 164, so that during the first data row of the next pair of frames the data passes through the partial-response filter 160 without change. However, when the MODULO-2 DATA FRAME COUNT selected by the multiplexer 165 for application to the write input connection of the digital delay line 164 is a ONE during the final row of the initial frame of a pair of data frames, a line of ONEs is written into the digital delay line 164, so that during the first data row of the final frame in the pair of data frames the data is one's complemented by passing through the partial-response filter 160. This causes the following data rows of the final frame in the pair of data frames to be one's complements of the corresponding data rows of the preceding initial frame in that pair of data frames.

The digital filtering provided by the partial-response filter 160 suppresses DC terms in an analog signal that is generated by converting the ZEROs and ONEs of the digital response at the output terminal 163 to +1 and −1 amplitudes of a keying signal, as for controlling the generation of BPSK signals. This digital filtering exhibits peaks of response at odd multiples of one-half the horizontal-scan-line frequency $f_H$ and exhibits nulls of response at multiples of the horizontal-scan-line frequency $f_H$. This digital filtering causes a PSK signal responsive to the data to have a comb-like frequency spectrum that complements the comb-like frequency spectrum of luminance signal, which exhibits nulls of response at odd multiples of one-half the horizontal-scan-line frequency $f_H$ and exhibits peaks of response at multiples of the horizontal-scan-line frequency $f_H$. The partial-response filter 160 shapes the spectrum of the PSK so that it will pass through a two-tap highpass line-comb filter comprising a single 1H delay line and a subtractor. Such a highpass line-comb filter can be located in the digital signal receiver for suppressing luminance signal having good correlation between vertically aligned pixels and reducing it as a jamming signal for the PSK.

Figure 3:
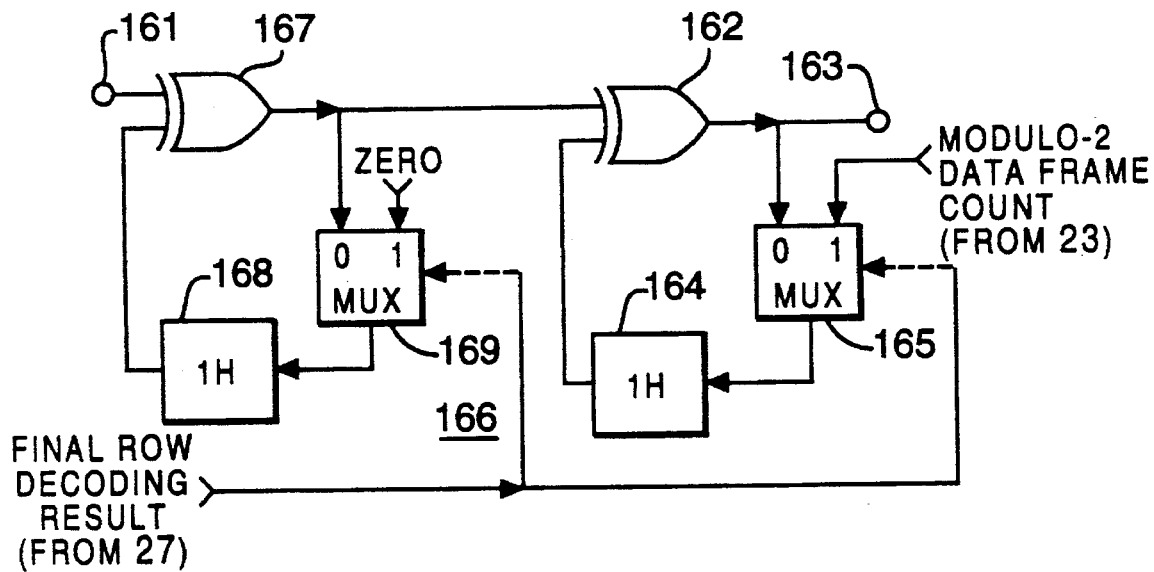

FIG. 3 shows another form 166 the partial-response filter 16 may take, which includes a final filtering section including the same elements 162–165 as the partial-response filter 160. The partial-response filter 166 further includes an initial filtering section similar to its final filtering section. This initial filtering section has a two-input exclusive-OR gate 167, with a first input to which the input terminal 161 connects and with an output to which the first input of the XOR gate 162 is connected, rather than to the input terminal 161 as in the partial-response filter 160 of FIG. 2. A second input of the XOR gate 167 receives from the read output connection of a digital delay line 168 a delayed response to the output signal from a multiplexer 169 applied to the write input connection of the digital delay line 168. The digital delay line 168, like the digital delay line 164, provides "1H" delay equal to the period of one television horizontal scan line. Except when the FINAL ROW DECODING RESULT supplied as control signal to the multiplexer 169 is ONE, indicating that the final data row of a data frame is being supplied to the partial-response filter 166, the multiplexer 169 selects the XOR gate 167 response for application to the write input connection of the digital delay line 168.

When the FINAL ROW DECODING RESULT supplied as control signal to the multiplexer 169 is ONE, indicating that the final data row is being supplied to the partial-response filter 166, the multiplexer 169 applies a wired ZERO to the write input connection of the digital delay line 164. This writes a row of ZEROs into the digital delay line 164 during the final row of each data frame. This row of ZEROs is supplied to the XOR gate 167 during the initial row of the next data frame so the initial row of data is transmitted by the XOR gate 167 to the XOR gate 162, for selective one's complementing as described with regard to the partial-response filter 160 of FIG. 2.

The partial-response filter 166 has a sharper-toothed comb response than the partial-response filter 160, but also exhibits nulls of response at odd multiples of one-half the horizontal-scan-line frequency $f_H$ and exhibits peaks of response at multiples of the horizontal-scan-line frequency $f_H$. In the digital signal receiver a three-tap highpass line-comb filter can be used for restoring the PSK signal to a flat frequency spectrum and reducing luminance signal as a jamming signal for the PSK.

Figure 4:
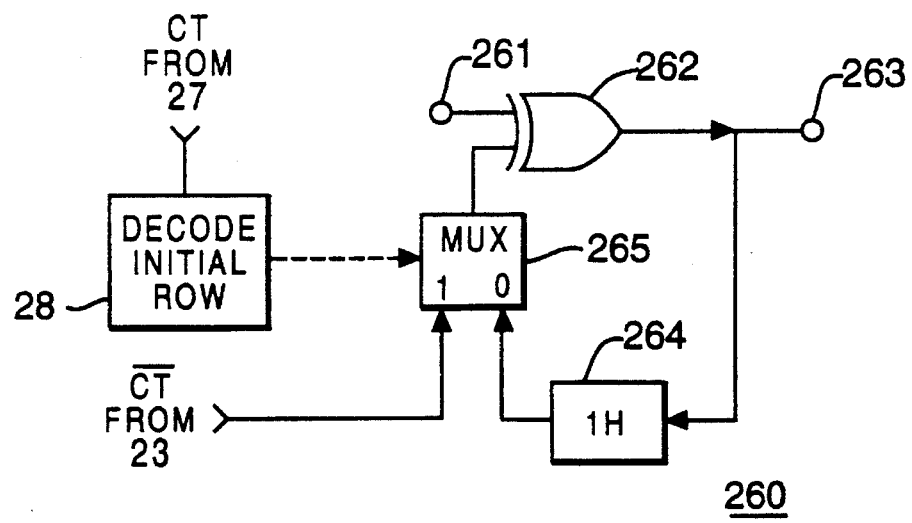

FIG. 4 is a schematic diagram of a partial-response filter 260, which can be used as the partial-response filter 16 in the FIG. 1 television transmitter instead of the partial-response filter 160 of FIG. 2. Digital input signal in serial-bit form is applied via an input terminal 261 to a first input of a two-input exclusive-OR (XOR) gate 262, the output from which connects to an output terminal 263 to supply thereto the response of the partial-response filter 260. The response of the partial-response filter 260 is applied to the input connection of a digital delay line 264, which supplies at its output connection a response to the output signal from the XOR gate 262 after "1H" delay. A second input of the XOR gate 262 receives signal from the output connection of a multiplexer 265, which receives an INITIAL ROW DECODING RESULT from an initial row decoder 28 as a control signal. The initial row decoder 28 receives DATA ROW COUNT from the counter 24 as input signal, responding with a ONE output signal to the value of DATA ROW COUNT indicating the data row to be the initial one of a data frame, and responding with a ZERO output signal to each other value of DATA ROW COUNT. Except when the INITIAL ROW DECODING RESULT supplied as control signal to the multiplexer 265 is ONE, the multiplexer 265 selects the delayed response at the output connection of the digital delay line 264 for application to the second input of the XOR gate 262. When the INITIAL ROW DECODING RESULT supplied as control signal to the multiplexer 265 is ONE, the multiplexer 265 selects the one's complement of the current MODULO-2 DATA FRAME COUNT for application to the second input of the XOR gate 262.

Figure 5:
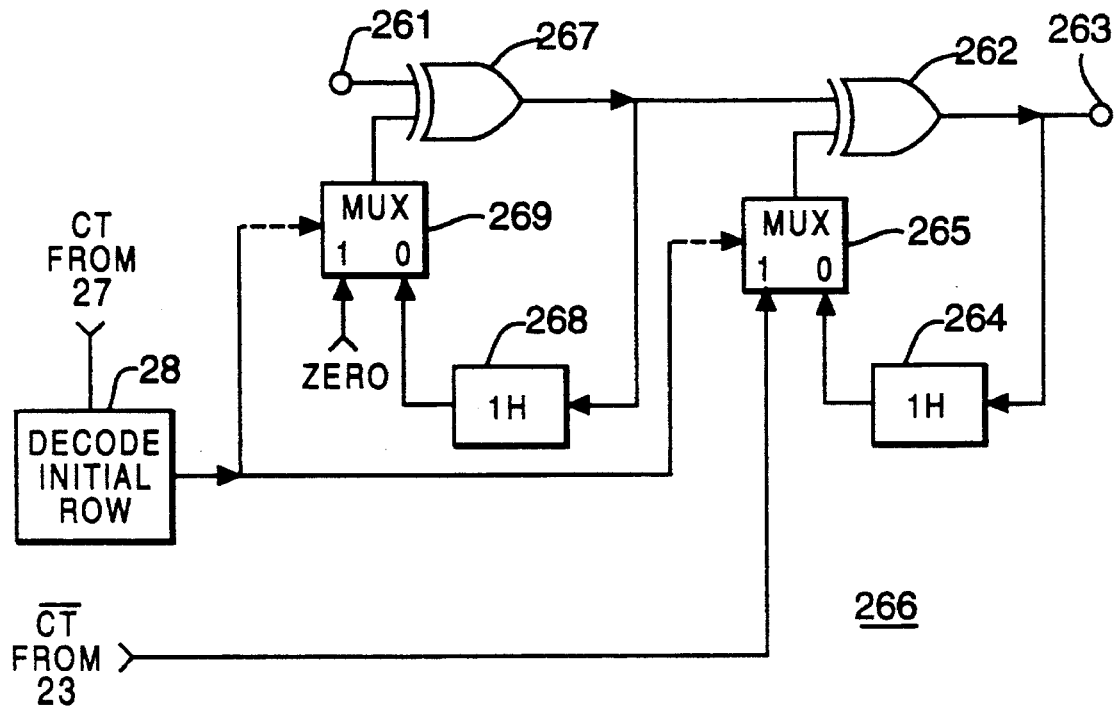

FIG. 5 is a schematic diagram of a partial-response filter 266, which can be used in the FIG. 1 television transmitter instead of the partial-response filter 166 of FIG. 3, and which includes a final filtering section including the same elements 262–265 as the partial-response filter 260. The partial-response filter 266 further includes an initial filtering section similar to its final filtering section. This initial filtering section has a two-input exclusive-OR gate 267, with a first input to which the input terminal 261 connects and with an output to which the first input of the XOR gate 262 is connected, rather than to the input terminal 261 as in the partial-response filter 260 of FIG. 4. The response of the XOR GATE 267 is applied to the input connection of a digital delay line 268, which supplies at its output connection a response to the output signal from the XOR gate 267 after "1H" delay. A second input of the XOR gate 268 receives signal from the output connection of a multiplexer 269, which receives the INITIAL ROW DECODING RESULT from the initial row decoder 28 as a control signal. Except when the INITIAL ROW DECODING RESULT supplied as control signal to the multiplexer 269 is ONE, the multiplexer 269 selects the delayed response at the output connection of the digital delay line 268 for application to the second input of the XOR gate 267. When the INITIAL ROW DECODING RESULT supplied as control signal to the multiplexer 269 is ONE, the multiplexer 269 selects a wired ZERO for application to the second input of the XOR gate 267.

The FIG. 5 partial-response filter 266 can be modified to apply the MODULO-2 FRAME COUNT to the multiplexer 265, rather than its one's complement, and to apply ONE to the multiplexer 269, rather than ZERO. The FIG. 3 partial-response filter 166 can be modified not to apply the MODULO-2 FRAME COUNT to the multiplexer 165, but rather to apply its one's complement, and to apply ONE to the multiplexer 169, rather than ZERO.

FIG. 6 shows in more detail the construction of the portion of the FIG. 1 TV transmitter 1 used for digitally filtering the digital data from which the phase-shift keying signal is to be generated. The error-correction coder 14 supplies digital signal in serial-bit form to a rate buffer 20. Preferably, the coder 14 is of a type generating modified Reed-Solomon codes; and the rate buffer 20 performs dual service as an interleaver. Interleaver operation of the rate buffer 20 places the original order of the scanning of data in columns, transverse to rows of data ultimately transmitted by the VSB BPSK data transmitter 12 simultaneously with respective horizontal scan lines of the composite video signal being transmitted by the VSB AM video transmitter 8. This is done so impulse noise and midband frequencies of composite video signal, which tend to have coherence in the horizontal direction, jam fewer bits of the modified Reed-Solomon codes than would be the case with modified Reed-Solomon codes operating on data mapped into rows along horizontal scan lines, rather than on data mapped into columns transverse to horizontal scan lines. In any case, the rate buffer 20 is a memory that supplies the bits on a regularly timed basis to a frame-store memory 21 for writing during and only during alternate data frames. Data frames are defined as blocks of 525 rows of symbols which occur at a symbol rate that is a multiple of data row scan rate, which data row scan rate is the same as the horizontal scan line rate for analog composite video signal. BPSK symbols are bits, but the symbols to which the modified Reed-Solomon codes are applied are customarily 2N-bit data, N being a small positive integer such as three, four or five. The bit length over which each of the modified Reed-Solomon codes extends is chosen to be less than 525 (e.g., 256 or 512), so that impulse noise is less likely to disrupt any one of the modified Reed-Solomon codes more than once along its length.

The relative phasing of the data rows and the horizontal scan lines of composite video signal is such that each data row coincides in time with a respective horizontal scan line of composite video signal. Data frames occur at the same rate as the frames of the analog composite video signal supplied by the source 7, but it is convenient to have the data frames lag the video signal frames by nine horizontal scan lines of composite video signal for reasons disclosed further on in this specification. The frame-store memory 21 is read the first data frame following its being written and is re-read before re-writing in the second data frame following its being written, to generate output signal supplied as input signal to the partial-response filter 16 during respective frames of consecutive pairs of data frames. The writing and reading of the rate buffer 20 and of the frame-store memory 21 is controlled by frame-store packing-control circuitry 22.

A frame counter at the transmitter 1 used to count eight-frame cycles for controlling the insertion of ghost-canceling reference signals into the composite video signals during selected vertical-blanking interval (VBI) scan lines includes, as a stage thereof, a modulo-2 data frame counter 23 used in timing the read and read-then-write over operations of the frame-store memory 21 during respective frames of each consecutive pair of data frames. The packing-control circuitry 22 also receives a DATA ROW COUNT signal from a data row counter 24 and a SYMBOL COUNT signal from a symbol counter 25, which the packing-control circuitry 22 applies to the frame-store memory 21 as row addressing and as within-row read addressing, respectively. DATA ROW COUNT and SYMBOL COUNT together comprise the complete addressing AD the packing-control circuitry 22 applies to the frame-store memory 21 in FIG. 6. The circuitry 22 also generates a write enable signal WE for the frame-store memory 21, read addressing RAD supplied to the rate buffer 20 in synchronism with the complete addressing AD supplied to the frame-store memory 21 during the writing thereof, and write addressing WAD for the rate buffer 20. When the digital data is selectively transmitted, the circuitry 22 also generates a read enable signal RE for the frame-store memory 21.

More particularly, the mode of operation can be as follows. The DATA FRAME COUNT bit is supplied from the frame counter 23 to the packing-control circuitry 22, there to be used to generate WRITE ENABLE signal for the frame-store memory 21 only when the modulo-2 DATA FRAME COUNT bit is ZERO. The packing-control circuitry 22 supplies READ ENABLE and WRITE ENABLE signals that condition the frame-store memory 21 to operate in a read-then-write-over mode when the modulo-2 DATA FRAME COUNT bit is ZERO. When the modulo-2 DATA FRAME COUNT bit is ONE, the packing-control circuitry 22 supplies READ ENABLE signals only.

A final row decoder 27 is supplied DATA ROW COUNT signal from a data row counter 24 and generates control signal for the multiplexer 165 in the partial-response filter 16 and for the multiplexer 169 if it is used in the filter 16. The final row decoder 27 supplies a ZERO output signal as FINAL ROW DECODING RESULT responsive to all values of DATA ROW COUNT except that indicative of the final row in the data frame, which ZERO output signal conditions the multiplexer 165 (and the multiplexer 169 if used) in the filter 16 to implement normal partial-response filtering by the filter 16. Responsive to DATA ROW COUNT being indicative of the final row in the data frame, the final row decoder 27 supplies a ONE response to the multiplexer 165 (and the multiplexer 169, if used) in the filter 16 to condition the loading of the 1-H delay line 164 (and the 1-H delay line 168, if used) with initial conditions in the filter 16 for the next data frame. The modulo-2 data frame counter 23 supplies MODULO-2 DATA FRAME COUNT as alternative input signal to the multiplexer 165, to be selected to the write input connection of the 1-H delay line 164 when the final row decoder 27 supplies a ONE to the multiplexer 165 as its control signal.

FIG. 6 shows symbol clocking circuitry 30 that includes, in addition to the symbol counter 25, a voltage-controlled oscillator (VCO) 31, a zero-crossing detector 32, a 255-count decoder 33 and an automatic frequency and phase control (AFPC) detector 34. The symbol counter 25 comprises eight binary counting stages. The zero-crossing detector 32, which might be more properly termed an average-axis-crossing detector, generates a pulse whenever the sinusoidal oscillations of the oscillator 30 cross their average axis in a prescribed direction. The zero-crossing detector 32 customarily comprises a limiter amplifier that generates square waves responsive to the sinusoidal oscillations of the VCO 31, a differentiator for generating pulses responsive to transitions of these square waves, and a clipper for separating pulses of one polarity to be supplied to the frame-store packing-control circuitry 22 for timing purposes. These pulses are also supplied to the symbol counter 25 to be counted in each consecutive line, thereby to generate the SYMBOL COUNT signal supplied to the packing-control circuitry 22. The 255-count decoder 33 decodes the SYMBOL COUNT reaching 255 to generate a pulse. Instead of letting the SYMBOL COUNT simply roll over to arithmetic zero because full count is an integral power of two, each pulse from the 255-count decoder 33 can be used to reset the counter 25 on the next pulse supplied to the counter 25 by the zero-crossing detector 32, thus returning SYMBOL COUNT to arithmetic zero. The 255-count decoder 33 supplies pulses to the AFPC detector 34, to be compared with the horizontal sync pulses H to develop an AFPC voltage supplied to the VCO 31. This completes a negative feedback loop that adjusts the frequency of the VCO 31 oscillations to be 255 times the horizontal scan line frequency, or 4 027 972 Hz.

One way of synchronizing counting by the modulo-2 data frame counter 23 and the data row counter 24 with the frames of analog composite video signal will now be considered. In a digital signal receiver for a system as described in this specification, it is preferable to synchronize the counter that regenerates DATA FRAME COUNT to the beginning of line 9 of each frame of the analog composite video signal, just after the trailing edge of the vertical sync pulse in the initial field of such frame. In such case, the counter that generates DATA ROW COUNT in the digital signal receiver is reset to prescribed count value at the beginning of line 9 of each frame of the analog composite video signal. The synchronizing of the counting by the modulo-2 data frame counter 23 and the data row counter 24 in the portion of the transmitter 1 shown in FIG. 6 conforms to the desired receiver practice.

The 255-count decoder 33 output signal is supplied as a first input signal to a two-input AND gate 36. The station sync generator 9 supplies vertical sync pulses V to a trailing edge detector 36, which supplies pulses at the conclusions of lines 9 of composite video signal and at the midpoints of lines 271 of composite video signal output signal is supplied as a second input signal to the AND gate 35. The response of the AND gate 35 consists of DATA-FRAME-END pulses at the conclusions of lines 9 of composite video signal. Each of these DATA-FRAME-END pulses is applied as a trigger pulse to the modulo-2 data frame counter 23, so as to advance the DATA FRAME COUNT signal, and is also applied to the data row counter 24 to reset its DATA ROW COUNT to prescribed initial value. In practice, the 255-count decoder 33 may be dispensed with, and the carry pulses from the final binary counting stage of the symbol counter 25 may be supplied to the AFPC detector 34 and to the AND gate 35 instead of the decoder 33 output signal.

FIG. 7 shows a digital-signal receiver 41 for receiving, from means such as an antenna 42, a television signal with a digital signal buried therewithin and extracting the buried digital signal. A tuner 43 selects the television channel to be detected by the first detector therein, which first detector is a tunable downconverter, conventionally of superheterodyne type, for converting the selected television signal to a set of intermediate frequencies and an image set of frequencies. A video intermediate-frequency (IF) filter 44 selects the video intermediate frequencies for application as input signal to an intermediate-frequency (IF) amplifier 45 and rejects the image set of frequencies. Following the current custom a surface-acoustic-wave (SAW) filter can be used for the video IF filter 44 and to construct the video IF amplifier 45 within a monolithic integrated circuit (IC), as a multi-stage amplifier without interstage tuning. The video IF amplifier 45 supplies the amplified video IF signal to an in-phase synchronous video detector 46 and to a quadrature-phase synchronous video detector 47. An oscillator 48 oscillating with a nominal frequency of 45.75 MHz supplies its oscillations to the in-phase synchronous video detector 46 without phase shift and to a quadrature-phase synchronous video detector 47 with 900 lagging phase shift provided by a shift network 49. The oscillator 48 has automatic frequency and phase control (AFPC) responding to the output signal of the quadrature-phase synchronous video detector 47. The synchronous video detectors 46 and 47 are customarily included together with the video IF amplifier 45 and portions of the oscillator 48 within the IC. Each of the video detectors 46 and 47 may either be of exalted carrier type or of true synchronous type. In-phase modified composite video signal recovered by the in-phase synchronous video detector 46 is supplied to a horizontal sync separator 50 and to a vertical sync separator 51, which recover horizontal and vertical synchronizing pulses from the in-phase modified composite video signal, respectively.

The aspects of the digital-signal receiver 41 thusfar considered are generally familiar to persons skilled in the art of TV receiver design, although the video IF filter 44 is preferably made only about 3.5 MHz wide and is centered at 45.25 MHz. This video IF filter 44 provides chroma rejection and in-channel sound rejection without need for chroma and in-channel sound rejection filtering after the quadrature-phase video detector 47. (When the digital-signal receiver 41 is constructed together with a television receiver, the video IF filter 44 may be widened, with chroma and in-channel sound rejection provided by filtering after the quadrature-phase video detector 47.) The bandwidth of the quadrature-phase video detector 47 should be somewhat wider than symbol rate, so as not to attenuate the upper frequencies in the "tail" of BPSK response. The quadrature-phase video detector 47 detects the keying signal, accompanied by only those portions of the NTSC composite video signals at frequencies above 750 kHz.

In practice the digital receiver 41 usually will include ghost suppression circuitry, which is not separately and explicitly shown in FIG. 7, but can be of the type described in detail in U.S. patent application Ser. No. 08/108,311 filed Aug. 20, 1993. Each of the in-phase and quadrature-phase video detectors 46 and 47 includes, after its synchronous detector per se, respective ghost cancellation and equalization filters similar to those used after the synchronous detector per se included in the other video detector. The adjustable parameters of the two ghost-cancellation filters are adjusted in parallel responsive to calculations made in a computer, and the adjustable parameters of the two equalization filters are also adjusted in parallel responsive to further calculations made in the computer. Ghost-cancellation reference (GCR) signals, which extend up to 4.1 MHz in frequency when transmitted, but extend to only 2.5 MHz or so in a digital signal receiver because of its limited IF bandwidth, are extracted from selected vertical-blanking-interval (VBI) scan lines of the video signal detected by the in-phase synchronous video detector 46. The GCR signals are digitized and supplied as input signal to the computer for calculating the adjustable parameters of the ghost-cancellation and equalization filters. Alternatively or additionally, direct-current or low-frequency components in the quadrature-phase video detector 47 response can be sensed and used as a basis for calculating the adjustable parameters of the ghost-cancellation filters.

In the FIG. 7 digital-signal receiver 41, a SYMBOL COUNT signal is generated by a symbol counter 52 counting pulses generated by a zero-crossing detector 53 in response to sinusoidal oscillations received from a voltage-controlled oscillator 54. A decoder 55 decodes the SYMBOL COUNT reaching 255 to generate a pulse that resets the counter 52 on the next pulse supplied to the counter 52 by the zero-crossing detector 53, returning SYMBOL COUNT to arithmetic zero. The pulses generated by the decoder 55 are supplied to an AFPC detector 56 to be compared to the horizontal sync pulses H separated by the horizontal sync separator 50 and adjustably delayed for fractions of a symbol interval by a controlled delay line 57. The results of the comparison are lowpass filtered within the AFPC detector 56 to generate an automatic frequency and phase control (AFPC) voltage signal for application to the VCO 54. These arrangements control the frequency of the oscillations supplied from the line-locked VCO 54 to be 256 times the horizontal scan line frequency $f_H$, or 4 027 972 Hz. The term "line-locked" used in reference to a controlled oscillator means that the frequency of its oscillations is maintained in constant ratio to the 15,734.264 Hz scan line frequency, which is customarily done by AFPC circuitry comparing the frequency of its oscillations as divided by a suitable factor to horizontal synchronizing pulses.

The keying signal and accompanying portions of the NTSC composite video signals at frequencies above 750 kHz detected by the quadrature-phase video detector 47 are supplied to a match filter 58, which responds to the keying signal but only selected portions of the accompanying above-750-kHz frequency components of composite video signal. The match filter 58 provides a peaking response that matches with the roll-off of the transition-shaping portion of the filter 18 in the transmitter to extend PSK bandwidth enough to reduce inter-symbol interference. The match filter 58 can also provide further peaking response to compensate for the roll-off of the detection efficiency of the quadrature-phase video detector 47 attributable to the VSB BPSK becoming increasingly single sideband in nature over the frequency range extending between 0.75 and 1.25 MHz and being substantially single sideband in nature over the frequency range extending upward from 1.25 MHz. However, since the vestigial sideband filters of different TV transmitters exhibit variations from each other, the peaking response to compensate for the roll-off of the detection efficiency of the quadrature-phase video detector 47 is probably better done at each TV transmitter 1, by modifying the transition shaping filter 18 to provide the appropriate peaking response in addition to shaping transitions. This additional peaking or pre-emphasis of binary keying signal at the transmitter 1 will, however increase the high frequency content of the BPSK above 0.75 MHz that is transmitted together with luminance signal.

The response from the match filter 58 is applied as input signal to a highpass line-comb filter 59, which is a match filter for the partial-response filter 160 of FIG. 2 being used for the partial-response filter 16 in the FIG. 1 transmitter 1. The highpass line-comb filter 59 suppresses the components of the composite video signal that accompany the detected keying signal but do not exhibit line-to-line change. The highpass line-comb filter 59 is preferably of analog type. The highpass line-comb filter 59, being of analog type, can reduce the dynamic range of the input signal supplied to an analog-to-digital converter (ADC) 65 used for digitizing the detected PSK. This facilitates the selection of the limited number of quantizing levels in the ADC 65 so as to reduce the corruption of the PSK by quantizing noise. An ADC with 10-bit resolution will certainly suffice, and an ADC with 8-bit resolution will probably suffice, to recover PSK of 3 IRE amplitude while sampling at only symbol rate. Sampling at symbol rate from the ADC 65, with optimal phasing, avoids the need for sampling at a multiple of symbol rate in order to minimize inter-symbol interference; and the resulting lower digital sampling rate saves hardware in subsequent digital filtering. Sampling at symbol rate from the ADC 65, with optimal phasing, is a form of synchronous symbol detection which suppresses response to those components of the composite video signal that exhibit change at symbol rate, but are in quadrature phasing with the sampling at symbol rate. The symbol counter 52 supplies the least significant bit of SYMBOL COUNT and its one's complement as 4 MHz square waves to the ADC 65 to time the sampling, at symbol rate, of the ADC 65 input signal during its digitization.

The highpass line-comb filter 59, being of analog type, supplies PSK that is reasonably free of remnant composite video signal much of the time and that contains, intact, information on data transitions. A zero-crossing detector 66 detects the zero-crossings of the response from the match filter 58, supplying them to a pulse phase discriminator 67. The pulse phase discriminator 67 selectively detects departures of the zero-crossings of the match filter 58 response, as detected by the zero-crossing detector 66, from proper phasing respective to the zero-crossings of the oscillations of the controlled oscillator 54, as detected by the zero-crossing detector 53. The pulse phase discriminator 67 lowpass filters these selectively detected departures, as sampled and held, thereby to generate a control signal for adjusting the delay the controlled delay line 57 provides for the horizontal sync pulses H applied to the AFPC detector 56. The phasing of the sampling, at symbol rate, of the ADC 65 input signal during its digitization is accordingly adjusted for minimal inter-symbol interference.

The selective detection by the pulse phase discriminator 67 is done during portions of the vertical blanking interval, when the response of quadrature-phase video detector 47 to composite video signals is expected to be zero-valued. In more sophisticated arrangements the video output from the in-phase video detector 46 can be applied to a highpass filter, so the amplitude of the components of composite video signal above 750 kHz can be monitored. Then, any time this amplitude is essentially zero, the selective detection by the pulse phase discriminator 67 is implemented. Selective detection by the pulse phase discriminator 67 will be done, not only during portions of the vertical blanking interval, but during portions of image scan as well. So, there is likelihood of the oscillations of the controlled oscillator 54 being slightly mis-phased late in an image field.

The arrangements for adjusting the phasing of the line-locked oscillator are of the type developed by Jung-Wan Ko, a co-worker with the inventor. The AFPC loop controlling the frequency and phasing of the oscillations of the controlled oscillator 54 with respect to the adjustably delayed horizontal sync pulses H supplied from the controlled delay line 57 provides a filtering function that avoids the ADC 65 clocking exhibiting a "glitch" or pronounced shortening of periodicity during phase adjustment. Such glitches occur at times if fine phase adjustment is attempted in the ADC 65 clocking itself.

The vertical sync separator 51 supplies "lossy" integrated response to separated vertical sync pulses V to a threshold detector 68, the threshold voltage of which is chosen such that it is exceeded only when the vertical sync pulses are integrated over more than five-and-a-half scan lines and less than six-and-a-half scan lines. The threshold detector 68 output signal, which is a ONE only when its input signal exceeds its threshold voltage and is otherwise a ZERO is supplied as a first input signal to a two-input AND gate 69. The decoder 55, which generates a ONE for the final value of SYMBOL COUNT in each data row (at the finishes of horizontal scan lines) and otherwise generates a ZERO, supplies its output signal to the AND gate 69 as a second input signal thereto. The AND gate 69 is responsive to the trailing edges of vertical pulses that occur at the beginning of the initial fields of composite video signal frames, to provide a respective DATA-FRAME-END pulse responsive to each of these edges, but is not responsive to the trailing edges of vertical pulses that occur between respective initial and final fields of frames.

The DATA-FRAME-END pulses in the AND gate 69 response are supplied to a modulo-2 data frame counter 70 as count input (CI) signal, so as to advance a regenerated DATA FRAME COUNT signal, which is offset by one scan line from the DATA FRAME COUNT signal at the transmitter. As noted in U.S. patent application Ser. No. 08/108, 311, the best way to arrange for synchronizing the DATA FRAME COUNT in the TV transmitter 1 and in the digital data receiver 41 is by reference to the ghost cancellation reference (GCR) signals which occur in prescribed permutations of burst phasing and Bessel chirp phasing in the 19$^{th}$ scan lines of a four-frame cycle. The single-binary-stage counter 70, which generates modulo-two DATA FRAME COUNT will often be one stage in a plural-binary-stage counter that generates a modulo-$2^N$ DATA FRAME COUNT, N being a positive integer at least two, which plural-binary-stage counter is used for timing the accumulation of the ghost cancellation reference (GCR) signals.

The DATA-FRAME-END pulses in the AND gate 69 response are also applied as a reset (R) signal to a data row counter 71 to reset the DATA ROW COUNT regenerated as its output signal, which should then be 524, to arithmetic zero. The data row counter 71 is connected to count the horizontal sync pulses H supplied from the horizontal sync separator 50. The DATA ROW COUNT is used to control the selection of the VBI scan lines containing GCR signals in the circuitry (not explicitly shown in FIG. 7) for acquiring data for the computer (also not explicitly shown in FIG. 7) that calculates the adjustable filtering parameters for the equalization and ghost-cancellation filters included within the video detectors 46 and 47.

The ADC 65 supplies digitized keying signal with some above 750 kHz remnants of composite video signal to a highpass frame-comb filter 72. The highpass frame-comb filter 72 comprises a digital subtractor 73 and a digital framestore 74 responding to signal samples applied to its input port to supply those signal samples at its output port the duration of one frame scan later in time. The digital framestore 74 is conveniently constructed as a RAM operated in a read-then-write-over mode. This RAM receives the DATA ROW COUNT from the counter 71 as line addressing (LAD) and the SYMBOL COUNT from the counter 52 as symbol addressing (SAD). The subtractor 73 receives as a minuend input signal from the ADC 65 samples of the digitized keying signal for the current frame and receives as a subtrahend input signal the corresponding samples of the digitized keying signal for the previous frame from the framestore 74. The difference signal from the subtractor 73 is the highpass frame-comb filter 72 response, from which remnant luminance components that exhibit frame-to-frame correlation are removed.

The analog signal that is supplied as input signal to the highpass line-comb filter 59 in part is descriptive of binary coding of keying signal, but the output signal from the highpass line-comb filter 59 in part is descriptive of ternary coding of keying signal and is digitized by the ADC 65 to supply input signal for the highpass frame-comb filter 72. The digitized signal that is supplied as output signal from the highpass frame-comb filter 72 is still descriptive of ternary coding of keying signal in alternate data frames that are valid data frames, since those data frames combine two data frames in which corresponding digital samples are of similar amplitudes and opposite polarities. In the intervening alternate data frames that are invalid data frames, the digitized signal that is supplied as output signal from the highpass frame-comb filter 72 is 5-level in nature, but symbol decisions based on the invalid data frames are of no concern. Symbol decision circuitry 75, which receives the highpass frame-comb filter 72 digital response as its input signal, accordingly has three comparator ranges respectively centered on −1 and 0 and +1. Symbol decision circuitry 75 includes an absolute-value circuit 751, which generates a rectified digital response to the output signal from the highpass frame-comb filter 72. The rectified digital response of the absolute-value circuit 751 is descriptive of binary coding of keying signal and is supplied to a threshold detector 752.

The threshold detector 752 is a type of symbol decision circuit well known in the art of digital communications for making symbol decisions with regard to binary coding of keying signal. The threshold detector 752 receives the symbol stream from absolute-value circuit 751 and makes a decision as to whether the symbol is most likely a ZERO or is most likely a ONE. The threshold detector 752 typically contains a digital comparator arranged to operate as threshold detector, with the threshold detection results being used to control the decision as to whether the symbol is most likely a ONE or is most likely a ZERO depending on whether or not a threshold digital value is exceeded. The threshold detector 752 is preferably of a type in which the threshold digital value for threshold detection is automatically adjusted responsive to symbol strength. In such case, the threshold detector 752 has associated with it circuitry for detecting the average peak level of the symbol stream supplied by absolute-value circuit 751, or its average level, or both. There is associated circuitry for reckoning from each level detected the digital value supplied to the comparator to establish the threshold for threshold detection. The detection procedures for determining symbol decision thresholds preferably are selectively implemented during the vertical blanking interval, when the composite video signal contributes almost no energy to the signal detected by the quadrature-phase video detector 47.

The symbol stream from the symbol decision circuitry 75 is supplied as input signal to a rate buffer 77, which is conditioned by the DATA FRAME COUNT to accept input samples from only those alternate frames in which keying signal is not canceled, but in which luminance signal components that do not exhibit frame-to-frame change are canceled. Digital samples are supplied to the rate buffer 77 at symbol rate and issue from the rate buffer 77 at one-half symbol rate for application to an error-correction decoder 78. Decoder 78 receives the results of the decisions by the symbol decision circuitry 75 as serial-bit digital input data and corrects the errors therein to provide corrected serial-bit digital data, which are the output data of the digital signal receiver 41 and should correspond to the serial-bit digital data that FIG. 1 shows the source 13 to supply to the television transmitter 1.

In preferred embodiments of the digital signal receiver 41, designed to be used with a transmitter 1 using modified Reed-Solomon codes operating on columns of data transverse to horizontal scan lines, rather than on rows of data along horizontal scan lines, the rate buffer 77 is operated as a de-interleaver for the error-correction decoder 78. The write address generator for the rate buffer 77 is not shown in FIG. 8. The read address generator comprises the data row counter 71 supplying DATA ROW COUNT the symbol counter 52 supplying SYMBOL COUNT as row and column addressing respectively in the RAM(s) within the rate buffer 77.

FIG. 8 shows a modification 79 of the digital signal receiver 41 of FIG. 7, designed to be used with a transmitter 1 using the partial-response filter 165 shown in FIG. 3. In this digital signal receiver 79 the highpass line-comb filter 59 is followed by another highpass line-comb filter 60. This cascade connection of highpass line-comb filters 59 and 60 is somewhat better suited to CCD construction than the equivalent circuit using a delay line tapped at zero, 1-H and 2-H delay intervals to supply input signals to a weighted summation network, therein to be weighted in (−0.25):0.5:(−0.25) ratio for developing a filter response.

When the partial-response filter in the transmitter is of the sort 165 shown in FIG. 3 or of equivalent sort, and when the digital signal receiver includes a three-scan-line highpass line-comb filter of the sort shown in FIG. 8 or of equivalent sort, the digital response of the highpass frame-comb filter 72 is essentially five-level, rather than ternary in nature, with regard to describing PSK signal during valid data frames. Accordingly, in FIG. 8 the symbol decision circuitry 75 of FIG. 7, which has three comparator ranges respectively centered on −1 and 0 and +1, is replaced by symbol decision circuitry 76, which has five comparator ranges centered on −2, −1, 0, +1 and +2. The symbol decision circuitry 76 includes an absolute-value circuit 761, which generates a rectified digital response to the output signal from the highpass frame-comb filter 72. The rectified digital response of the absolute-value circuit 761 is descriptive of ternary coding of keying signal superposed on a direct-voltage pedestal, rather than being descriptive of binary coding of keying signal, so this rectified digital response is supplied to a dual-threshold detector 762. The dual-threshold threshold detector 762 receives the symbol stream from absolute-value circuit 761 and makes a decision as to whether the symbol is most likely a ZERO, is most likely a ONE or is most likely a TWO, TWOs being equated to ZEROs. The dual-threshold threshold detector 762 typically contains two digital comparators each arranged to operate as single-threshold detector, one at a threshold digital value twice as large as the other, and some simple logic circuitry for deciding the identity of the symbol depending on the threshold detection results. If neither threshold digital value is exceeded, the logic circuitry indicates that the symbol is most likely a ZERO. If only the lower threshold digital value is exceeded, the logic circuitry indicates that the symbol is most likely a ONE. If both the lower and higher threshold digital values are exceeded, the logic circuitry indicates that the symbol is most likely a TWO and it is equated to ZERO. The dual-threshold threshold detector 762 is preferably of a type in which the digital values supplied to the comparators for determining the thresholds for threshold detection are automatically adjusted responsive to symbol strength. In such case, the dual-threshold threshold detector 762 has associated circuitry for detecting the average level of the symbol stream supplied by absolute-value circuit 761, or its average peak level, or both. There is circuitry for reckoning from each level detected the digital values supplied to the digital comparators to establish their respective thresholds for threshold detection. The detection procedures for determining symbol decision thresholds preferably are selectively implemented during the vertical blanking interval, when the composite video signal contributes almost no energy to the signal detected by the quadrature-phase video detector 47.

The symbol decision circuits 75 and 76 each make "hard" decisions to supply binary input signal into the decoder 78, for implementing what data communications engineers term "hard-decision" forward error correction. The symbol decision circuits 75 and 76 can be replaced with circuitry that supplies input signals with multiple levels into a suitable decoder, for implementing what data communications engineers term "soft-decision" forward error correction instead, of course.

FIG. 9 shows in detail one form 590 that the highpass line-comb filter 59 can take. An input terminal 591 of the filter 590 connects to the non-inverting input connection of a differential-input amplifier 592 having its output connection connected to an output terminal 593 of the filter 590. The inverting input connection of the differential-input amplifier 592 receives from the output connection of an analog delay line 594 a delayed response to the output signal from a multiplexer 595, which multiplexer 595 output signal is applied to the input connection of the delay line 594. The analog delay line 594 provides delay equal to the duration of one horizontal scan line. Such a "1-H" delay line is usually constructed as a charge-coupled-device (CCD) shift register, if it is to be analog in nature, and the differential-input amplifier 592 is usually included in the charge-sensing output stage of the CCD shift register, constructed in a monolithic integrated circuit (IC) together with the CCD shift register and its charge-injecting input circuitry. The multiplexer 595 is conveniently constructed in the same IC using field-effect transistors operated as transmission gates.

The multiplexer 595 receives control signal from a decoder 61, which responds with a ONE to the DATA ROW COUNT from the data row counter 71 reaching the value associated with the final row of data in a data frame and that responds with a ZERO to all other values of DATA ROW COUNT. Responsive to the decoder 61 output signal being a ONE, the multiplexer 595 selects analog zero for its output response. Responsive to the decoder 61 output signal being a ZERO, the multiplexer 595 selects the detected BPSK signal supplied to the input terminal 591 for application to the input connection of the 1-H delay line 594.

FIG. 10 shows in detail another form 596 that the highpass line-comb filter 59 can take, which is alternative to the form shown in FIG. 9 and does not include elements 594 and 595. The output connection of a multiplexer 597 connects to the inverting input connection of the differential-input amplifier 592 in FIG. 10. The multiplexer 597 receives control signal from a decoder 62, which responds with a ONE to the DATA ROW COUNT from the data row counter 71 being reset to the value associated with the initial row of data in a data frame and that responds with a ZERO to all other values of DATA ROW COUNT. Responsive to the decoder 62 output signal being a ONE, the multiplexer 597 selects analog zero for its output response. Responsive to the decoder 61 output signal being a ZERO, the multiplexer 597 selects the output signal from a 1-H analog delay line 598 for application to the non-inverting input connection of the differential-input amplifier 592. The output signal from the 1-H analog delay line 598 is a delayed response to the signal supplied to the input terminal 591 of the filter 59, the delay being equal to the duration of one horizontal scan line.

FIG. 11 shows in detail one form that the cascade connection of the highpass line-comb filters 59 and 60 can take. The highpass line-comb filter 590 is the same as in FIG. 9; and a highpass line-comb filter 600 in FIG. 11 has elements 601–605 which correspond to the elements 591–595 of the highpass line-comb filter 590 and are similarly connected within the confines of each filter.

FIG. 12 shows in detail another form that the cascade connection of the highpass line-comb filters 59 and 60 can take. The highpass line-comb filter 596 is the same as in FIG. 10; and a highpass line-comb filter 606 in FIG. 12 has elements 607 and 608 which correspond to the elements 597 and 598 of the highpass line-comb filter 596 and are similarly connected within the confines of each filter.

FIG. 13 shows a form that the rate buffer 20 shown in FIG. 6 can take when it is to be used as an interleaver for modified Reed-Solomon coding furnished from the error-correction coder 14. A data frame pair counter 80 receives as its count input (CI) signal a carry out (CO) signal supplied from the data frame counter 23. The data frame pair counter 80 controls the alternated writing and reading of two data frame-store random access memories 81 and 82 operated as an interleaver for error-correction coding. The RAMs 81 and 82 are written from the error-correction coder 14 at one-half PSK rate during alternate frame pair intervals, the address scanning being by column and by symbols per column. Each of the RAMs 81 and 82 is read to the frame-store memory 21 at PSK rate in each frame pair interval following a frame pair interval in which it is written, the address scanning being by row and by symbols per row. The "symbols" per row referred to here are PSK symbols or bits, not the 2N-bit symbols associated with the modified Reed-Solomon codes considered from a coding standpoint.

An address multiplexer 83 receives DATA ROW COUNT from the data row counter 24 and SYMBOL/ROW COUNT from the symbol (i.e., symbol-per-row) counter 25 as read addressing. The address multiplexer 83 receives DATA COLUMN COUNT from a data column counter 84 and SYMBOL/COLUMN COUNT from a symbol-per-column counter 85 as write addressing. The zero-crossing detector 32 furnishes triggering pulses at PSK rate to a triggered flip-flop 86, which functions as a frequency divider for supplying alternate transitions of its output signal at one-half PSK rate to the symbol-per-column counter 85 as count input (CI). A decoder 87 decodes the SYMBOL/COLUMN COUNT reaching full count (525 assuming symbol per column count starts at zero) to furnish a ONE as count input (CI) signal for the data column counter 84. The decoder 87 output signal is supplied as a first input signal to a two-input OR gate 88, which OR gate 88 responds to a ONE from the decoder 87 to furnish a ONE as reset (R) signal to the symbol-per-column counter 85 for resetting the SYMBOL/COLUMN COUNT to its initial value.

The second input signal to the OR gate 88 and the reset (R) signal to the data column counter 84 are furnished by the output response from a 3-input AND gate 89, which response when it is ONE resets both the SYMBOL/COLUMN COUNT and the DATA COLUMN COUNT to their respective initial values. A decoder 260 supplies a logic ONE to a first input of the AND gate 89 when and only when the DATA ROW COUNT indicates that the final row of the data frame is reached; otherwise the decoder 260 supplies a logic ZERO as its output signal to the AND gate 89. (The decoder 260 can be the decoder 27 of FIG. 6 when the partial-response filter 160 is used in the transmitter 1 so the decoder 27 is designed to supply a logic ONE when and only when the DATA ROW COUNT indicates that the final row of the data frame is reached.) The output signal from the final-symbol-of-the-data-row decoder 33 and the MODULO-2 DATA FRAME COUNT from the data frame counter 23 are applied to the AND gate 88 as the other two of its three input signals. The AND gate 88 output response is a ONE only when the final symbol of the final data row is reached in the odd frame, just before the even frame is reached when a selected one of the RAMs 81 and 82 is to be read to the frame-store memory 21 data row by data row.

Modulo-2 DATA FRAME PAIR COUNT from the data frame pair counter 80 being a ONE conditions the address multiplexer 83 to select read addressing to the RAM 81 and to select write addressing to the RAM 82. Modulo-2 DATA FRAME PAIR COUNT from the data frame pair counter 80 being a ONE enables the RAM 81 to be read data row by data row to the frame-store memory 21, and the one's complement of that count being a ZERO enables the RAM 82 to be written data column by data column from the error-correction coder 14.

Modulo-2 DATA FRAME PAIR COUNT from the data frame pair counter 80 being a ZERO conditions the address multiplexer 83 to select read addressing to the RAM 82 and to select write addressing to the RAM 81. Modulo-2 DATA FRAME PAIR COUNT from the data frame pair counter 80 being a ZERO enables the RAM 82 to be read data row by data row to the frame-store memory 21, and the one's complement of that count being a ONE enables the RAM 81 to be written data column by data column from the error-correction coder 14.

FIG. 14 shows a form that the rate buffer 77 shown in FIG. 7 or 8 can take when it is to be used as a de-interleaver for modified Reed-Solomon coding furnished from the symbol decision circuitry 75 or 76. A data frame pair counter 90 receives as its count input (CI) signal a carry out (CO) signal supplied from the data frame counter 70. The data frame pair counter 90 controls the alternated writing and reading of two data frame-store random access memories 91 and 92 operated as a de-interleaver for error-correction coding. The RAMs 91 and 92 are written only during alternate even frames, the data for writing the RAMs 91 and 92 being supplied from the symbol decision circuitry 75 or 76 at PSK rate, the address scanning being by row and by symbols per row. The "symbols" per row referred to here are PSK symbols or bits, not the $2^N$-bit symbols associated with the modified Reed-Solomon codes considered from a coding standpoint. Each of the RAMs 91 and 92 is read to the frame-store memory 21 at one-half PSK rate during alternate frame pair intervals, the address scanning being by column and by symbols per column.

An address multiplexer 93 receives DATA ROW COUNT from the data row counter 71 and SYMBOL/ROW COUNT from the symbol (i.e., symbol-per-row) counter 52 as write addressing. The address multiplexer 93 receives DATA COLUMN COUNT from a data column counter 94 and SYMBOL/COLUMN COUNT from a symbol-per-column counter 95 as read addressing. The zero-crossing detector 53 furnishes triggering pulses at PSK rate to a triggered flip-flop 96, which functions as a frequency divider for supplying alternate transitions of its output signal at one-half PSK rate to the symbol-per-column counter 95 as count input (CI). A decoder 97 decodes the SYMBOL/COLUMN COUNT reaching full count (525 assuming symbol per column count starts at zero) to furnish a ONE as count input (CI) signal for the data column counter 94. The decoder 97 output signal is supplied as a first input signal to a two-input OR gate 98, which OR gate 98 responds to a ONE from the decoder 97 to furnish a ONE as reset (R) signal to the symbol-per-column counter 95 for resetting the SYMBOL/COLUMN COUNT to its initial value.

The second input signal to the OR gate 98 and the reset (R) signal to the data column counter 94 are furnished by the output response from a 3-input AND gate 99, which response when it is ONE resets both the SYMBOL/COLUMN COUNT and the DATA COLUMN COUNT to their respective initial values. The decoder 61 supplies a logic ONE to a first input of the AND gate 99 when and only when the DATA ROW COUNT indicates that the final row of the data frame is reached; otherwise the decoder 61 supplies a logic ZERO as its output signal to the AND gate 99. The output signal from the final-symbol-of-the-data-row decoder 55 and the MODULO-2 DATA FRAME COUNT from the data frame counter 70 are applied to the AND gate 98 as the other two of its three input signals. The AND gate 98 output response is a ONE only when the final symbol of the final data row is reached in the odd frame, just before the even frame is reached when a selected one of the RAMs 91 and 92 is to be written data row by data row from the symbol decision circuitry 75 or 76.

Modulo-2 DATA FRAME PAIR COUNT from the data frame pair counter 90 being a ONE conditions the address multiplexer 93 to select read addressing to the RAM 91 and to select write addressing to the RAM 92. DATA FRAME PAIR COUNT from the data frame pair counter 90 being a ONE enables the RAM 91 to be read data column by data column to the error-correction decoder 78. A two-input AND gate 101 selectively supplies a ONE as write enable (WE) signal to the RAM 92, responsive to the one's complements of the DATA FRAME COUNT and the DATA FRAME PAIR COUNT from the counters 70 and 90 both being ZEROs. This WE signal enables the RAM 92 to be written data row by data row from the symbol decision circuitry 75 or 76.

Modulo-2 DATA FRAME PAIR COUNT from the data frame pair counter 90 being a ZERO conditions the address multiplexer 93 to select read addressing to the RAM 92 and to select write addressing to the RAM 91. DATA FRAME PAIR COUNT from the data frame pair counter 90 being a ZERO enables the RAM 92 to be read data column by data column to the error-correction decoder 78. A two-input AND gate 102 selectively supplies a ONE as write enable (WE) signal to the RAM 91, responsive to the one's complement of the DATA FRAME COUNT being a ZERO and the DATA FRAME PAIR COUNT from the counter 90 being a ONE. This WE signal enables the RAM 91 to be written data row by data row from the symbol decision circuitry 75 or 76.

The rate buffering, done in the digital signal receivers 41 and 79 so as to fill the gap left when alternate frames of non-valid signal arising from the frame-comb filtering of paired frames are discarded, can take place after the frame-comb filtering, but before the symbol decision circuitry. Rate buffering is preferably done after symbol decision, however, since then the frame-store memory need only be one-bit deep, rather than many bits deep. Doing rate buffering together with de-interleaving before error-correction decoding is preferable, since it avoids the need for a separate frame-store memory for rate buffering. Where rate buffering is done separately from de-interleaving, the rate buffering can be done with just one frame-store memory, if it is a dual-ported RAM having a read-only port supplied by a shift register the serial stages of which can be loaded in parallel a row at a time from the RAM portion accessed through a read/write port.

The data transmission schemes described in this specification provide for a single, reasonably-wideband data transmission channel. A variety of different services can be provided via this single data transmission channel using time-division-multiplex schemes of various types. For example, data can be transmitted in packets with each successive packet being provided header information for indicating the nature of the data service provided and the originator of the data service. The television broadcasters and the cablecaster can be originators of various data services. In two-way data transmission schemes the packet heading identifying the originator can be used for selecting the proper data return channel, such as a telephone link or a dedicated channel in a cablecast system.

The embodiments of the invention currently preferred by the inventor have been described, but one skilled in the art of communications systems, transmitter and receiver design will be enabled by acquaintance with the foregoing disclosure to design a number of alternative embodiments of the invention; and this should be borne in mind when construing the scope of the claims which follow this specification.

In one modification of the FIG. 1 transmitter 1, which provides a modified transmitter that is a non-preferred embodiment of the invention in certain of its aspects, output signal from the frame pairing circuitry 15 is applied directly to the DAC 17, rather than being filtered by the partial response filter 16. Such modified transmitter is to be used with a modified FIG. 7 digital-signal receiver 41 that is a non-preferred embodiment of the invention in certain other of its aspects. The FIG. 7 digital-signal receiver 41 is modified so as to dispense with the highpass line-comb filter 59, the match filter 58 response being applied directly to the ADC 65, and so as to dispense with the absolute-value circuitry 75 and symbol decision circuitry 76, the sign bit of the highpass frame-comb filter 72 response being applied to directly to the rate buffer 77.

The line- and frame-comb filters in other digital signal receivers embodying the invention in certain of its aspects can be realized entirely in the analog regime, by way of example, or entirely in the digital regime, by way of further example; and the order of their connection in cascade can then be altered. Thomas Vincent Bolger, a co-worker with the inventor, has suggested the use of an oversampling analog-to-digital converter preceding cascaded line- and frame-comb filters realized entirely in the digital regime.

The partial-response filtering shown in FIGS. 2, 3, 4 and 5 is done presuming that, in the digital signal receiver, highpass comb filtering will be done which discriminates against composite video signal based on line-to-line correlation of samples one above the other. Partial-response filtering can be done presuming that receiver highpass comb filtering will be done which discriminates against composite video signal based on correlation of side-by-side samples. Additional partial-response filtering undesirably increases the number of comparator ranges involved in symbol decision, however, which tends to decrease the accuracy of symbol decisions and increase the probability of bit error. The correlation of side-by-side samples of composite video signal in the quadrature-phase video detector response is already substantially reduced, because the detector is insensitive to the luminance frequencies below 750 kHz and has reduced sensitivity to luminance frequencies from 0.75 to 1.25 kHz. So, the probability of bit error being decreased because of the luminance signal being reduced as a jamming signal is offset by the probability of bit error being increased owing to the larger number of comparator ranges involved in symbol decision. Additional partial-response filtering can also be done presuming that receiver highpass comb filtering will be done which discriminates against composite video signal based on correlation of samples diagonally displaced from each other.

The inventor points out that the data transmission scheme described in U.S. patent application Ser. No. 08/108,311 can be modified to include partial-response filtering, so that data and composite video signals can be better separated from each other, using highpass line-comb filtering to separate data from luminance signal and using lowpass line-comb filtering to separate data from chrominance signal.

What is claimed is:

1. A system for transmitting digital information together with a composite video signal, said system comprising:
   a source of audio signal;
   a source of composite video signal descriptive of successive horizontal scan lines of successive video frames, said successive video frames having a prescribed video frame rate, said successive horizontal scan lines having a prescribed horizontal scan line rate, and each of said video frames consisting of a prescribed number of horizontal scan lines of said composite video signal, said composite video signal having horizontal and vertical synchronizing pulses inserted therewithin;
   a source of binary phase-shift-keying signal encoding said digital information;
   a frequency-modulation transmitter for modulating the frequency of an audio carrier wave in accordance with said audio signal, thereby to generate a respective output signal;
   a first vestigial-sideband amplitude-modulation transmitter for modulating the amplitude of a video carrier wave in accordance with said composite video signal, thereby to generate a respective output signal;
   a second vestigial-sideband amplitude-modulation transmitter for modulating the amplitude of a suppressed carrier wave in accordance with said binary phase-shift-keying signal, thereby to generate a respective output signal; and
   a frequency multiplexer for combining the respective output signals of said first and second vestigial-sideband amplitude-modulation transmitters with the output signal of said frequency-modulation transmitter, such that said suppressed carrier wave is in quadrature phasing with said video carrier wave.

2. A system as set forth in claim 1 wherein said source of binary phase-shift-keying signal comprises:
   a source of serial-bit digital information supplied at a bit rate that is a multiple of said prescribed horizontal scan line rate;
   a two-input exclusive-OR gate having a first input connection from said source of serial-bit digital information, having a second input connection, and having an output connection at which exclusive-OR gate response is provided;
   a 1-H delay line having an input connection from the output connection of said exclusive-OR gate and having an output connection to the second input connection of said exclusive-OR gate, said 1-H delay line delaying said exclusive-OR gate response as applied to the second input connection of said exclusive-OR gate for a time interval equal to the duration 1-H of a horizontal scan line having said prescribed horizontal scan line rate; and
   a digital-to-analog converter having an input connection from the output connection of said exclusive-OR gate and having an output connection from which said binary phase-shift-keying signal is supplied.

3. A system as set forth in claim 1 wherein said source of binary phase-shift-keying signal comprises:
   a source of serial-bit digital information supplied at a bit rate that is a multiple of said prescribed horizontal scan line rate;
   a first two-input exclusive-OR gate having a respective first input connection from said source of serial-bit digital information, having a respective second input connection, and having a respective output connection at which first exclusive-OR gate response is provided;
   a first 1-H delay line having an input connection from the output connection of said first exclusive-OR gate and having an output connection to the second input connection of said first exclusive-OR gate, said first 1-H delay line delaying said first exclusive-OR gate response as applied to the second input connection of said first exclusive-OR gate for a time interval equal to the duration 1-H of a horizontal scan line having said prescribed horizontal scan line rate;
   a second two-input exclusive-OR gate having a respective first input connection from the output connection of said first exclusive-OR gate, having a respective second input connection, and having a respective output connection at which second exclusive-OR gate response is provided;
   a second 1-H delay line having an input connection from the output connection of said second exclusive-OR gate and having an output connection to the second input connection of said second exclusive-OR gate, said second 1-H delay line delaying said second exclusive-OR gate response as applied to the second input connection of said second exclusive-OR gate for a time interval equal to the duration 1-H of a horizontal scan line having said prescribed horizontal scan line rate; and
   a digital-to-analog converter having an input connection from the output connection of said second exclusive-OR gate and having an output connection from which said binary phase-shift-keying signal is supplied.

4. A system as set forth in claim 1 wherein said source of binary phase-shift-keying signal comprises:
   a digital frame-store memory for temporarily storing a prescribed number of rows of bits, there being the same number of bits in each row, said number of rows being substantially the same as said prescribed number of horizontal scan lines of said composite video signal and comprising a data frame, said digital frame-store memory having a write input connection, a write enable input connection, a read output connection, a read enable input connection, a column address input bus and a row address input bus;

a controlled oscillator providing oscillations at a multiple of said prescribed horizontal scan line rate, which oscillations are locked in frequency and phase by said horizontal synchronizing pulses;

a symbol counter for counting the oscillations of said controlled oscillator modulo said multiple of said prescribed horizontal scan line rate, said symbol counter connected for responding to each said horizontal synchronizing pulse to reset said symbol count to a prescribed base count value for said symbol count, said symbol count being supplied to the column address input bus of said digital frame-store memory;

a detector for detecting a prescribed time in each video frame of said composite video signal, thereby to generate a data-frame-end pulse;

a data row counter for modularly counting said horizontal synchronizing pulses to generate a data row count modulo said prescribed number of horizontal scan lines of said composite video signal in each of said video frames, said data row counter connected for responding to each said data-frame-end pulse to reset said data row count to a prescribed base count value for said data row count, said data row count being supplied to the row address input bus of said digital frame-store memory;

a data frame counter for counting said data-frame-end pulses, thereby to generate a modulo-2 data frame count signal alternately having first and second states;

a rate buffer having an input connection for receiving digital information and having an output connection to the write input connection of said digital frame-store memory;

frame-store packing-control circuitry, responding to said first state of said modulo-2 data frame count signal for supplying read enable signals to the read enable input connection of said digital frame-store memory, and responding to said second state of said modulo-2 data frame count signal for supplying read enable and write enable signals respectively to the read enable input connection and the write enable input connection of said digital frame-store memory so as to implement a read-then-write-over operation, and controlling said rate buffer so as to supply bits to the write input connection of said digital frame-store memory during said read-then-write-over operation;

a digital-to-analog converter having an output connection from which said binary phase-shift-keying signal is supplied and having an input connection; and means for applying a response to read-out signal from the read output connection of said digital frame-store memory to the input connection of said digital-to-analog converter, in a first polarity sense during data frames when said modulo-2 data frame count signal is ONE and in a second polarity sense during data frames when said modulo-2 data frame count signal is ZERO, said first and second senses of polarity being opposites of each other.

5. A system as set forth in claim 4 wherein said rate buffer is operated as an interleaver and said system further comprises:

a source of serial-bit digital information supplied at a bit rate that is a multiple of said prescribed horizontal scan line rate;

an error-correction coder having an input connection for receiving said serial-bit digital information supplied from said source and having an output connection to the input connection of said rate buffer.

6. A system as set forth in claim 5 wherein said means for applying a response to read-out signal from the read output connection of said digital frame-store memory to the input connection of said digital-to-analog converter is a partial-response filter that comprises:

a two-input exclusive-OR gate having a respective first input connection from the read output connection of said digital frame-store memory, having a respective second input connection, and having a respective output connection for supplying exclusive-OR gate response for application to the input connection of said digital-to-analog converter; and a 1-H delay line having an input connection from the output connection of said exclusive-OR gate and having an output connection to the second input connection of said exclusive-OR gate, said 1-H delay line delaying said exclusive-OR gate response as applied to the second input connection of said exclusive-OR gate for a time interval equal to the duration 1-H of a horizontal scan line having said prescribed horizontal scan line rate.

7. A system as set forth in claim 5 wherein said means for applying a response to read-out signal from the read output connection of said digital frame-store memory to the input connection of said digital-to-analog converter is a partial-response filter that comprises:

a first two-input exclusive-OR gate having a respective first input connection from the read output connection of said digital frame-store memory, having a respective second input connection, and having a respective output connection for supplying first exclusive-OR gate response;

a first 1-H delay line having an input connection from the output connection of said first exclusive-OR gate and having an output connection to the second input connection of said first exclusive-OR gate, said first 1-H delay line delaying said first exclusive-OR gate response as applied to the second input connection of said first exclusive-OR gate for a time interval equal to the duration 1-H of a horizontal scan line having said prescribed horizontal scan line rate;

a second two-input exclusive-OR gate having a respective first input connection from the output connection of said first exclusive-OR gate, having a respective second input connection, and having a respective output connection for supplying second exclusive-OR gate response to the input connection of said digital-to-analog converter; and a second 1-H delay line having an input connection from the output connection of said second exclusive-OR gate and having an output connection to the second input connection of said second exclusive-OR gate, said second 1-H delay line delaying said second exclusive-OR gate response as applied to the second input connection of said second exclusive-OR gate for a time interval equal to the duration 1-H.

8. A system as set forth in claim 4 wherein said means for applying a response to read-out signal from the read output connection of said digital frame-store memory to the input connection of said digital-to-analog converter is a partial-response filter that comprises:

a final row decoder for detecting when said data row count has a value indicative that the final row of data in a data frame is reached to generate a final row indication and for otherwise generating a non-final row indication;

a two-input exclusive-OR gate having a respective first input connection from the read output connection of said digital frame-store memory, having a respective second input connection, and having a respective output connection for supplying first exclusive-OR gate response to the input connection of said digital-to-analog converter;

a two-input multiplexer having a first input connection for receiving a binary input signal the values of which depend on the first and second states of said modulo-2 data frame count signal respectively, having a second input connection for receiving said first exclusive-OR gate response, having an output connection, being conditioned by said final row indication for supplying at its said output connection an output signal which is responsive to said binary input signal, and being conditioned by said non-final row indication for supplying at its said output connection an output signal which is responsive to said first exclusive-OR gate response; and a 1-H delay line having an input connection from the output connection of said two-input multiplexer and having an output connection to the second input connection of said exclusive-OR gate, said 1-H delay line delaying the output signal of said two-input multiplexer as applied to the second input connection of said exclusive-OR gate for a time interval equal to the duration 1-H of a horizontal scan line having said prescribed horizontal scan line rate.

9. A system as set forth in claim 4 wherein said means for applying a response to read-out signal from the read output connection of said digital frame-store memory to the input connection of said digital-to-analog converter is a partial-response filter that comprises:

an initial row decoder for detecting when said data row count has a value indicative that the initial row of data in a data frame is reached to generate a initial row indication and for otherwise generating a non-initial row indication;

a two-input exclusive-OR gate having a respective first input connection from the read output connection of said digital frame-store memory, having a respective second input connection, and having a respective output connection for supplying first exclusive-OR gate response to the input connection of said digital-to-analog converter;

a 1-H delay line having an input connection from the output connection of said exclusive-OR gate and having an output connection, said 1-H delay line delaying said exclusive-OR gate response as applied to the second input connection of said exclusive-OR gate for a time interval equal to the duration 1-H of a horizontal scan line having said prescribed horizontal scan line rate; and a two-input multiplexer having a first input connection for receiving a binary input signal the values of which depend on the first and second states of said modulo-2 data frame count signal respectively, having a second input connection for receiving the delayed exclusive-OR gate response from the output connection of said 1-H delay line, having an output connection to the second input connection of said exclusive-OR gate, being conditioned by said initial row indication for supplying at its said output connection an output signal which is responsive to said binary input signal, and being conditioned by said non-initial row indication for supplying at its said output connection an output signal which is responsive to said delayed exclusive-OR gate response.

10. A system as set forth in claim 4 wherein said means for applying a response to read-out signal from the read output connection of said digital frame-store memory to the input connection of said digital-to-analog converter is a partial-response filter that comprises:

a final row decoder for detecting when said data row count has a value indicative that the final row of data in a data frame is reached to generate a final row indication and for otherwise generating a non-final row indication;

a first two-input exclusive-OR gate having a respective first input connection receiving signal from the read output connection of said digital frame-store memory, having a respective second input connection, and having a respective output connection for supplying first exclusive-OR gate response;

a first two-input multiplexer having a first input connection for receiving a prescribed one of first and second states of binary input signal, having a second input connection for receiving said first exclusive-OR gate response, having an output connection, being conditioned by said final row indication for supplying at its said output connection an output signal which is responsive to said binary input signal, and being conditioned by said non-final row indication for supplying at its said output connection an output signal which is responsive to said first exclusive-OR gate response;

a first 1-H delay line having an input connection from the output connection of said first two-input multiplexer and having an output connection to the second input connection of said first exclusive-OR gate, said first 1-H delay line delaying said first the output signal of said two-input multiplexer as applied to the second input connection of said first exclusive-OR gate for a time interval equal to the duration 1-H of a horizontal scan line having said prescribed horizontal scan line rate;

a second two-input exclusive-OR gate having a respective first input connection from the output connection of said first exclusive-OR gate, having a respective second input connection, and having a respective output connection for supplying second exclusive-OR gate response to the input connection of said digital-to-analog converter;

a second two-input multiplexer having a first input connection for receiving a binary input signal the values of which depend on the first and second states of said modulo-2 data frame count signal respectively, having a second input connection for receiving said second exclusive-OR gate response, having an output connection, being conditioned by said final row indication for supplying an output signal which is responsive to said binary input signal, and being conditioned by said non-final row indication for supplying an output signal which is responsive to said second exclusive-OR gate response; and a second 1-H delay line having an input connection from the output connection of said second two-input multiplexer and having an output connection to the second input connection of said second exclusive-OR gate, said second 1-H delay line delaying the output signal of said two-input multiplexer as applied to the second input connection of said second exclusive-OR gate for a time interval equal to the duration 1-H.

11. A system as set forth in claim 4 wherein said means for applying a response to read-out signal from the read output connection of said digital frame-store memory to the input connection of said digital-to-analog converter is a partial-response filter that comprises:

an initial row decoder for detecting when said data row count has a value indicative that the initial row of data in a data frame is reached to generate a initial row indication and for otherwise generating a non-initial row indication;

a first two-input exclusive-OR gate having a respective first input connection receiving signal from the read output connection of said digital frame-store memory, having a respective second input connection, and having a respective output connection for supplying first exclusive-OR gate response;

a first 1-H delay line having an input connection from the output connection of said first exclusive-OR gate and having an output connection to the second input connection of said first exclusive-OR gate, said first 1-H delay line delaying said first exclusive-OR gate response as applied to the second input connection of said first exclusive-OR gate for a time interval equal to the duration 1-H of a horizontal scan line having said prescribed horizontal scan line rate;

a first two-input multiplexer having a first input connection for receiving a binary input signal the values of which depend on the first and second states of said modulo-2 data frame count signal respectively, having a second input connection for receiving the delayed first exclusive-OR gate response from the output connection of said 1-H delay line, having an output connection to the second input connection of said exclusive-OR gate, being conditioned by said initial row indication for supplying at its said output connection an output signal which is responsive to said binary input signal, and being conditioned by said non-initial row indication for supplying at its said output connection an output signal which is responsive to said delayed first exclusive-OR gate response;

a second two-input exclusive-OR gate having a respective first input connection from the output connection of said first exclusive-OR gate, having a respective second input connection, and having a respective output connection for supplying second exclusive-OR gate response to the input connection of said digital-to-analog converter; and a second 1-H delay line having an input connection from the output connection of said second exclusive-OR gate and having an output connection, said second 1-H delay line delaying said second exclusive-OR gate response as applied to the second input connection of said second exclusive-OR gate for a time interval equal to the duration 1-H and a two-input multiplexer having a first input connection for receiving a binary input signal the values of which depend on the first and second states of said modulo-2 data frame count signal respectively, having a second input connection for receiving the delayed second exclusive-OR gate response from the output connection of said second 1-H delay line, having an output connection to the second input connection of said second exclusive-OR gate, being conditioned by said initial row indication for supplying at its said output connection an output signal which is responsive to said binary input signal, and being conditioned by said non-initial row indication for supplying at its said output connection an output signal which is responsive to said delayed second exclusive-OR gate response.

12. A system as set forth in claim 4 wherein said detector for detecting a prescribed time in each video frame of said composite video signal, thereby to generate a data-frame-end pulse, detects the trailing edge of only the initial vertical synchronizing pulse occurring in each frame of composite video signal.

13. A digital signal receiver for use with a system which in a combined transmission with a video carrier wave the amplitude of which is modulated in accordance with a composite video signal serially transmits digital symbols in binary phase-shift keying modulation sidebands of a suppressed carrier wave in quadrature phasing with said video carrier wave, said digital signal receiver comprising:

detection apparatus for responding to said combined transmission to detect the binary phase-shift keying of said suppressed carrier wave and thereby generate a desired detector response, as accompanied by undesired detector response composed of remnants of the composite video signal detected from the amplitude-modulated video carrier wave;

a cascade connection of a highpass line-comb filter and a high-pass frame-comb filter for selecting against said undesired detector response in a combined comb filter response supplied from said cascade connection, said combined comb filter response having multiple levels of response to each digital symbol; and symbol decision circuitry responsive to said combined comb filter response for deciding the identity of each digital symbol to generate a bit-serial digital signal response.

14. A digital signal receiver as set forth in claim 13 wherein said high-pass frame-comb filter succeeds said high-pass line-comb filter in their said cascade connection and comprises:

an input connection of said high-pass frame-comb filter for receiving response from said high-pass line-comb filter;

an output connection of said high-pass frame-comb filter for supplying said combined comb filter response;

a one-frame delay line for delaying the response from said high-pass line-comb filter as received at the input connection of said high-pass frame-comb filter by a time interval equal to the duration of a frame scan of said composite video signal; and a subtractor having a first input connection for receiving the delayed response from said one-frame delay line, having a second input connection connected without substantial delay from the input connection of said high-pass frame-comb filter, and having an output connection for supplying differential response to signals at the first and second input connections of said subtractor to the output connection of said high-pass frame-comb filter.

15. A digital signal receiver as set forth in claim 14 wherein the response from said high-pass line-comb filter is digitized before being supplied to the input connection of said high-pass frame-comb filter; wherein said one-frame delay line is a random access memory operated in a read-then-write-over mode; and wherein said subtractor is a digital subtractor.

16. A digital signal receiver as set forth in claim 15 further comprising an analog-to-digital converter having an input connection for receiving the response of said high-pass line-comb filter in analog form and having an output connection for supplying digitized response of said high-pass line-comb filter to the input connection of said high-pass frame-comb filter.

17. A digital signal receiver as set forth in claim 16 wherein said high-pass line-comb filter comprises:

an input connection of said high-pass line-comb filter for receiving said desired detector response, as accompanied by undesired detector response composed of remnants of the composite video signal detected from the amplitude-modulated video carrier wave;

an output connection of said high-pass line-comb filter to the input connection of said analog-to-digital converter;

a 1-H analog delay line for delaying the desired detector response, as accompanied by undesired detector response, as received at the input connection of said high-pass line-comb filter by a time interval equal to the duration of a horizontal scan line of said composite video signal; and a differential-input amplifier having a first input connection for receiving the delayed response from said 1-H analog delay line, having a second input connection connected without substantial delay from the input connection of said high-pass line-comb filter, and having an output connection for supplying differential response to signals at the first and second input connections of said differential-input amplifier to the output connection of said high-pass line-comb filter.

18. A digital signal receiver as set forth in claim 17 wherein said symbol decision circuitry comprises:

an absolute-value circuit having an input connection for receiving said combined comb filter response and having an output connection for supplying a rectified response; and a threshold detector having an input connection for receiving said rectified response from the output connection of said absolute-value circuit and having an output connection for supplying bits of a digital signal, each bit being in a first state when said rectified response exceeds a threshold level and being in a second state when said rectified response does not exceed said threshold level.

19. A digital signal receiver as set forth in claim 16 wherein said high-pass line-comb filter comprises:

an input connection of said high-pass line-comb filter for receiving said desired detector response, as accompanied by undesired detector response composed of remnants of the composite video signal detected from the amplitude-modulated video carrier wave;

an output connection of said high-pass line-comb filter to the input connection of said analog-to-digital converter;

a first 1-H analog delay line for delaying the desired detector response, as accompanied by undesired detector response, as received at the input connection of said high-pass line-comb filter by a time interval equal to the duration 1-H of a horizontal scan line of said composite video signal;

a first differential-input amplifier having a first input connection for receiving the delayed response from said first 1-H analog delay line, having a second input connection connected without substantial delay from the input connection of said high-pass line-comb filter, and having an output connection for supplying differential response to signals at the first and second input connections of said first differential-input amplifier;

a second 1-H analog delay line for delaying the differential response of said first differential-input amplifier by a time interval equal to the duration 1-H; and a second differential-input amplifier having a first input connection for receiving the delayed response from said second 1-H analog delay line, having a second input connection connected without substantial delay from the output connection of said first differential-input amplifier, and having an output connection for supplying differential response to signals at the first and second input connections of said second differential-input amplifier to the output connection of said high-pass line-comb filter.

20. A digital signal receiver as set forth in claim 19 wherein said symbol decision circuitry comprises:

an absolute-value circuit having an input connection for receiving said combined comb filter response and having an output connection for supplying a rectified response; and a dual-threshold detector having an input connection for receiving said rectified response from the output connection of said absolute-value circuit and having an output connection for supplying bits of a digital signal, each bit being in a first state when said rectified response exceeds a first threshold level but not a second threshold level higher than the first threshold level, and each bit being in a second state when said rectified response does not exceed said first threshold level or exceeds both said first and said second threshold levels.

21. A digital signal receiver for use with a system for transmitting digital information in binary phase-shift keying modulation sidebands of a suppressed carrier wave in quadrature phasing with a video carrier wave the amplitude of which is modulated in accordance with a composite video signal, said digital signal receiver comprising:

a tuner for supplying intermediate-frequency signal response to a selected radio-frequency signal comprising an amplitude-modulated video carrier wave and binary phase-shift-keyed suppressed carrier wave;

an intermediate-frequency amplifier for said intermediate-frequency signal response, said intermediate-frequency amplifier including filtering and amplifying elements and supplying an amplified intermediate-frequency amplifier response;

first controlled oscillator circuitry for generating in-phase and quadrature-phase intermediate-frequency video carrier waves, at an intermediate frequency and average phase which are controlled by a frequency and phase error signal;

an in-phase video detector receptive of said amplified intermediate-frequency amplifier response for synchronously detecting a composite video signal therefrom in accordance with said in-phase intermediate-frequency video carrier wave supplied thereto;

a quadrature-phase video detector receptive of said amplified intermediate-frequency amplifier response for synchronously detecting a binary phase-shift-keying signal therefrom in accordance with said quadrature-phase intermediate-frequency video carrier wave supplied thereto, which phase binary phase-shift-keying signal is accompanied by portions of said composite video signal including said frequency and phase error signal;

a horizontal sync separator for separating horizontal synchronizing pulses from the composite video signal detected by said in-phase video detector;

second controlled oscillator circuitry for generating symbol clocking oscillations at a frequency and phase controlled by said separated horizontal synchronizing pulses;

an analog-to-digital converter having an input connection for receiving an analog input signal and having an output connection for supplying digitized response to samples of said analog input signal as sampled responsive to said symbol clocking oscillations;

a 1-H delay line, having an input connection to which binary phase-shift-keying signal from said quadrature-phase video detector is applied, and having an output connection supplying a delayed response to said binary phase-shift-keying signal which response is delayed respective to the binary phase-shift-keying signal applied to its input connection for a time interval equal to the duration 1-H of a horizontal scan line having a prescribed horizontal scan line rate;

a differential-input amplifier responding differentially to said binary phase-shift-keying signal from said quadrature-phase video detector and said delayed response thereto at the output connection of said 1-H delay line for generating said analog input signal received by said analog-to-digital converter at its said input connection;

a digital highpass frame-comb filter having an input connection from the output connection of said analog-to-digital converter and having an output connection for supplying digital highpass frame-comb filter response; and symbol-decision circuitry having an input connection to which said digital highpass frame-comb filter response is supplied and having an output connection for supplying respective output signal bits.

22. A digital signal receiver as set forth in claim 21 wherein said symbol decision circuitry comprises:

an absolute-value circuit having an input connection for receiving said combined comb filter response and having an output connection for supplying a rectified response; and a threshold detector having an input connection for receiving said rectified response from the output connection of said absolute-value circuit and having an output connection for supplying bits of a digital signal, each bit being in a first state when said rectified response exceeds a threshold level and being in a second state when said rectified response does not exceed said threshold level.

23. A digital signal receiver as set forth in claim 22, wherein the output signal bits supplied from the output connection of said symbol-decision circuitry are supplied at symbol rate, said digital signal receiver further comprising:

a vertical sync separator for separating vertical synchronizing pulses from the composite video signal detected by said in-phase video detector;

a data frame counter for counting separated vertical synchronizing pulses that occur when symbol-per-row count is not in the mid-row region, thereby to generate a data frame count; and a rate buffer having an input connection connected for receiving bits from the output connection of said symbol-decision circuitry, receiving said bits when and only when said data frame count modulo-2 has a prescribed one of two values, and having an output connection for supplying said symbol-decision circuitry output signal bits at one-half symbol rate and in a prescribed order.

24. A digital signal receiver as set forth in claim 23, wherein said rate buffer is operated as a de-interleaver for supplying said symbol-decision circuitry output signal bits at one-half symbol rate and in data-column-by-data-column order to an error-correction decoder.

25. A digital signal receiver as set forth in claim 23, further comprising:

a symbol-per-row counter for counting said symbol clocking oscillations, thereby to generate a symbol-per-row count, said symbol-per-row counter responding to each said separated horizontal synchronizing pulse to reset said symbol count to a prescribed base count value for said symbol count;

a data row counter for counting each time said symbol-per-row counter is reset, thereby to generate a data row count, said data row counter responding to each said separated vertical synchronizing pulse to reset said data row count to a prescribed base count value for said data row count; and at least one random access memory included in said rate buffer, written at individual times by bits from the output connection of said symbol-decision circuitry when and only when said data frame count modulo-2 has said prescribed one of two values, and receiving said data row count and symbol-per-row count together as write addressing during said individual times.

26. A digital signal receiver for use with a system for transmitting digital information in binary phase-shift keying modulation sidebands of a suppressed carrier wave in quadrature phasing with a video carrier wave the amplitude of which is modulated in accordance with a composite video signal, said digital signal receiver comprising:

a tuner for supplying intermediate-frequency signal response to a selected radio-frequency signal comprising an amplitude-modulated video carrier wave and binary phase-shift-keyed suppressed carrier wave;

an intermediate-frequency amplifier for said intermediate-frequency signal response, said intermediate-frequency amplifier including filtering and amplifying elements and supplying an amplified intermediate-frequency amplifier response;

first controlled oscillator circuitry for generating in-phase and quadrature-phase intermediate-frequency video carrier waves, at an intermediate frequency and average phase which are controlled by a frequency and phase error signal;

an in-phase video detector receptive of said amplified intermediate-frequency amplifier response for synchronously detecting a composite video signal therefrom in accordance with said in-phase intermediate-frequency video carrier wave supplied thereto;

a quadrature-phase video detector receptive of said amplified intermediate-frequency amplifier response for synchronously detecting a binary phase-shift-keying signal therefrom in accordance with said quadrature-phase intermediate-frequency video carrier wave supplied thereto, which phase binary phase-shift-keying signal is accompanied by portions of said composite video signal including said frequency and phase error signal;

a horizontal sync separator for separating horizontal synchronizing pulses from the composite video signal detected by said in-phase video detector;

second controlled oscillator circuitry for generating symbol clocking oscillations at a frequency and phase controlled by said separated horizontal synchronizing pulses;

an analog-to-digital converter having an input connection for receiving an analog input signal and having an output connection for supplying digitized response to samples of said analog input signal as sampled responsive to said symbol clocking oscillations;

a first 1-H delay line, having an input connection to which binary phase-shift-keying signal from said quadrature-phase video detector is applied, and having an output connection supplying a delayed response to said binary phase-shift-keying signal which response is delayed respective to the binary phase-shift-keying signal applied to its input connection for a time interval equal to the duration 1-H of a horizontal scan line having a prescribed horizontal scan line rate;

a first differential-input amplifier responding differentially to said binary phase-shift-keying signal from said quadrature-phase video detector and said delayed response thereto at the output connection of said first 1-H delay line for generating a first differential-input amplifier response;

a second 1-H delay line, having an input connection to which said first differential-input amplifier response is applied, and having an output connection supplying a delayed response to said first differential-input amplifier response, which response is delayed respective to said first differential-input amplifier response applied to its input connection for a time interval equal to the duration 1-H;

a second differential-input amplifier responding differentially to said first differential-input amplifier response and said delayed response thereto at the output connection of said second 1-H delay line, for generating said analog input signal received by said analog-to-digital converter at its said input connection;

a digital highpass frame-comb filter having an input connection from the output connection of said analog-to-digital converter and having an output connection for supplying digital highpass frame-comb filter response; and symbol-decision circuitry having an input connection to which said digital highpass frame-comb filter response is supplied and having an output connection for supplying respective output signal bits.

27. A digital signal receiver as set forth in claim 26 wherein said symbol decision circuitry comprises:

an absolute-value circuit having an input connection for receiving said combined comb filter response and having an output connection for supplying a rectified response; and a dual-threshold detector having an input connection for receiving said rectified response from the output connection of said absolute-value circuit and having an output connection for supplying bits of a digital signal, each bit being in a first state when said rectified response exceeds a first threshold level but not a second threshold level higher than the first threshold level, and each bit being in a second state when said rectified response does not exceed said first threshold level or exceeds both said first and said second threshold levels.

28. A digital signal receiver as set forth in claim 27, wherein the output signal bits supplied from the output connection of said symbol-decision circuitry are supplied at symbol rate, said digital signal receiver further comprising:

a vertical sync separator for separating vertical synchronizing pulses from the composite video signal detected by said in-phase video detector;

a data frame counter for counting separated vertical synchronizing pulses that occur when symbol-per-row count is not in the mid-row region, thereby to generate a data frame count; and a rate buffer having an input connection connected for receiving bits from the output connection of said symbol-decision circuitry, receiving said bits when and only when said data frame count modulo-2 has a prescribed one of two values, and having an output connection for supplying said symbol-decision circuitry output signal bits at one-half symbol rate and in a prescribed order.

29. A digital signal receiver as set forth in claim 28, wherein said rate buffer is operated as a de-interleaver for supplying said symbol-decision circuitry output signal bits at one-half symbol rate and in data-column-by-data-column order to an error-correction decoder.

30. A digital signal receiver as set forth in claim 28, further comprising:

a symbol-per-row counter for counting said symbol clocking oscillations, thereby to generate a symbol-per-row count, said symbol-per-row counter responding to each said separated horizontal synchronizing pulse to reset said symbol count to a prescribed base count value for said symbol count;

a data row counter for counting each time said symbol-per-row counter is reset, thereby to generate a data row count, said data row counter responding to each said separated vertical synchronizing pulse to reset said data row count to a prescribed base count value for said data row count; and at least one random access memory included in said rate buffer, written at individual times by bits from the output connection of said symbol-decision circuitry when and only when said data frame count modulo-2 has said prescribed one of two values, and receiving said data row count and symbol-per-row count together as write addressing during said individual times.

31. A television signal manifested in physical form, said television signal comprising:

a video carrier wave amplitude-modulated in accordance with composite video signal; and a binary phase-shift-keyed carrier wave of the same frequency as said video carrier wave and in quadrature phasing with said video carrier wave, the binary phase shift keying being done in accordance with a first bit-serial digital signal during at least trace portions of horizontal scan lines including those in which composite video signal is descriptive of television images.

32. A television signal as set forth in claim 31, wherein said bit-serial digital signal has a bit-rate that is a multiple of said prescribed scan line rate, so the bits of said bit-serial digital signal are apportioned to data rows each co-extensive in time with at least trace portions of a respective horizontal scan line.

33. A television signal manifested in physical form, said television signal comprising:

an audio carrier wave frequency-modulated in accordance with at least one audio signal;

a video carrier wave amplitude-modulated in accordance with composite video signal; and a binary phase-shift-keyed carrier wave of the same frequency as said video carrier wave and in quadrature phasing with said video carrier wave, the binary phase shift keying being done in accordance with a bit-serial digital signal during at least trace portions of horizontal scan lines including those in which composite video signal is descriptive of television images.

34. A television signal as set forth in claim 33, wherein said composite video signal describes a succession of consecutive-in-time video frames each having a prescribed number of horizontal scan lines therein occurring at a prescribed scan line rate; wherein said bit-serial digital signal has a bit-rate that is a multiple of said prescribed scan line rate, so the bits of said bit-serial digital signal are apportioned to data rows each co-extensive in time with at least trace portions of a respective horizontal scan line.

35. A television signal manifested in physical form, said television signal comprising:

a video carrier wave amplitude-modulated in accordance with composite video signal, wherein said composite video signal describes a succession of consecutive-in-time video frames each having a prescribed number of horizontal scan lines therein occurring at a prescribed scan line rate; and a binary phase-shift-keyed carrier wave in quadrature phasing with said video carrier wave, the binary phase shift keying being done in accordance with a first bit-serial digital signal that occurs in a succession of consecutive-in-time data frames each of the same duration in time as each of said video frames, said data frames being considered for purposes of claiming to be consecutively ordinally numbered modulo-two in order of their occurrence in time, said first bit-serial digital signal in each even-numbered data frame comprising one's complements of said first bit-serial digital signal in an adjoining odd-numbered frame, such that said binary phase-shift-keyed carrier wave locally averages to zero over any even number of video frames.

36. A television signal as set forth in claim 35, wherein the bit rate of said first bit-serial digital signal is a multiple of said prescribed scan line rate; wherein each of said data frames includes a number of rows of bits of said first bit-serial digital signal equal to the prescribed number of horizontal scan lines per video frame; and wherein most of the time said first bit-serial signal is the modulo-two sum of a second bit-serial signal and said second bit-serial signal as delayed by one row.

37. A television signal as set forth in claim 36, wherein said second bit-serial signal is the result of interleaving a modified Reed-Solomon error-correction coding of a third bit-serial signal.

38. A television signal as set forth in claim 36, wherein most of the time said second bit-serial signal is the modulo-two sum of a third bit-serial signal and said third bit-serial signal as delayed by one row.

39. A television signal as set forth in claim 38, wherein said third bit-serial signal is the result of interleaving a modified Reed-Solomon error-correction coding of a fourth bit-serial signal.

40. A television signal manifested in physical form, said television signal comprising:

a video carrier wave amplitude-modulated in accordance with composite video signal, wherein said composite video signal describes a succession of consecutive-in-time video frames each having a prescribed number of horizontal scan lines therein occurring at a prescribed scan line rate; and a binary phase-shift-keyed carrier wave in quadrature phasing with said video carrier wave, the binary phase shift keying being done in accordance with a first bit-serial digital signal that has a bit-rate that is a multiple of said prescribed scan line rate, so the bits of said first bit-serial digital signal are apportioned to data rows each co-extensive in time with at least trace portions of a respective horizontal scan line, said first bit-serial digital signal being the modulo-two sum of a second bit-serial signal and said second bit-serial signal as delayed by one row.

41. A television signal as set forth in claim 40, wherein said second bit-serial signal is the result of interleaving a modified Reed-Solomon error-correction coding of a third bit-serial signal.

42. A television signal as set forth in claim 40, wherein most of the time said second bit-serial signal is the modulo-two sum of a third bit-serial signal and said third bit-serial signal as delayed by one row.

43. A television signal as set forth in claim 42, wherein said third bit-serial signal is the result of interleaving a modified Reed-Solomon error-correction coding of a fourth bit-serial signal.

44. A television signal manifested in physical form, said television signal comprising:

an audio carrier wave frequency-modulated in accordance with at least one audio signal;

a video carrier wave amplitude-modulated in accordance with composite video signal; and a binary phase-shift-keyed carrier wave of the same frequency as said video carrier wave and in quadrature phasing with said video carrier wave, the binary phase shift keying being done in accordance with a first bit-serial digital signal during at least trace portions of horizontal scan lines including those in which composite video signal is descriptive of television images;

wherein said composite video signal describes a succession of consecutive-in-time video frames each having a prescribed number of horizontal scan lines therein occurring at a prescribed scan line rate;

wherein said bit-serial digital signal has a bit-rate that is a multiple of said prescribed scan line rate, so the bits of said bit-serial digital signal are apportioned to data rows each co-extensive in time with a respective horizontal scan line; and wherein said bit-serial digital signal is the modulo-two sum of another bit-serial signal and said other bit-serial signal as delayed by one row.

45. A television signal manifested in physical form, said television signal comprising:

an audio carrier wave frequency modulated in accordance with at least one audio signal;

a video carrier wave amplitude-modulated in accordance with composite video signal; and a binary phase-shift-keyed carrier wave of the same frequency as said video carrier wave and in quadrature phasing with said video carrier wave, the binary phase shift keying being done in accordance with a first bit-serial digital signal during at least trace portions of horizontal scan lines including those in which composite video signal is descriptive of television images;

wherein said composite video signal describes a succession of consecutive-in-time video frames each having a prescribed number of horizontal scan lines therein occurring at a prescribed scan line rate;

wherein said bit-serial digital signal occurs in a succession of consecutive-in-time data frames each of the same duration in time as each of said video frames, said data frames being considered for purposes of claiming to be consecutively ordinally numbered modulo-two in order of their occurrence in time; and wherein said bit-serial digital signal in each even-numbered data frame comprises one's complements of said bit-serial digital signal in an adjoining odd-numbered frame, such that said binary phase-shift-keyed carrier wave locally averages to zero over any even number of video frames.

46. A television signal as set forth in claim 45, wherein said bit-serial digital signal has a bit-rate that is a multiple of said prescribed scan line rate, so the bits of said bit-serial digital signal can be considered to be apportioned to data rows each co-extensive in time with a respective horizontal scan line.

47. A television signal manifested in physical form, said television signal comprising:

a video carrier wave amplitude-modulated in accordance with composite video signal; and a binary phase-shift-keyed carrier wave of the same frequency as said video carrier wave, the binary phase shift keying being done in accordance with a first bit-serial digital signal during at least trace portions of horizontal scan lines including those in which composite video signal is descriptive of television images;

wherein said composite video signal describes a succession of consecutive-in-time video frames each having a prescribed number of horizontal scan lines therein occurring at a prescribed scan line rate;

wherein said bit-serial digital signal has a bit-rate that is a multiple of said prescribed scan line rate, so the bits of said bit-serial digital signal are apportioned to data rows each co-extensive in time with a respective horizontal scan line; and wherein said bit-serial digital signal is the modulo-two sum of another bit-serial signal and said other bit-serial signal as delayed by one row.

48. A television signal manifested in physical form, said television signal comprising:

a video carrier wave amplitude-modulated in accordance with composite video signal; and a binary phase-shift-keyed carrier wave of the same frequency as said video carrier wave, the binary phase shift keying being done in accordance with a first bit-serial digital signal during at least trace portions of horizontal scan lines including those in which composite video signal is descriptive of television images;

wherein said composite video signal describes a succession of consecutive-in-time video frames each having a prescribed number of horizontal scan lines therein occurring at a prescribed scan line rate;

wherein said bit-serial digital signal occurs in a succession of consecutive-in-time data frames each of the same duration in time as each of said video frames, said data frames being considered for purposes of claiming to be consecutively ordinally numbered modulo-two in order of their occurrence in time; and wherein said bit-serial digital signal in each even-numbered data frame comprises one's complements of said bit-serial digital signal in an adjoining odd-numbered frame, such that said binary phase-shift-keyed carrier wave locally averages to zero over any even number of video frames.

* * * * *